(12) United States Patent
Ide

(10) Patent No.: US 9,601,147 B2
(45) Date of Patent: Mar. 21, 2017

(54) OPTICAL INFORMATION RECORDING AND REPRODUCING APPARATUS AND OPTICAL INFORMATION RECORDING AND REPRODUCING METHOD

(71) Applicant: Hitachi Consumer Electronics Co., Ltd., Tokyo (JP)

(72) Inventor: Tatsuro Ide, Tokyo (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 14/442,189

(22) PCT Filed: Nov. 27, 2012

(86) PCT No.: PCT/JP2012/080649
§ 371 (c)(1),
(2) Date: May 12, 2015

(87) PCT Pub. No.: WO2014/083619
PCT Pub. Date: Jun. 5, 2014

(65) Prior Publication Data
US 2015/0340055 A1    Nov. 26, 2015

(51) Int. Cl.
*G11B 7/0065* (2006.01)
*G11B 7/1381* (2012.01)
(Continued)

(52) U.S. Cl.
CPC ............ *G11B 7/0065* (2013.01); *G11B 7/083* (2013.01); *G11B 7/094* (2013.01); *G11B 7/1381* (2013.01);
(Continued)

(58) Field of Classification Search
None
See application file for complete search history.

(56) References Cited

U.S. PATENT DOCUMENTS

2004/0179251 A1  9/2004 Anderson et al.
2005/0141064 A1  6/2005 Aoki et al.
(Continued)

FOREIGN PATENT DOCUMENTS

JP  2004-272268 A  9/2004
JP  2005-196826 A  7/2005
(Continued)

OTHER PUBLICATIONS

Japanese Office Action received in corresponding Japanese Application No. 2014-549671 dated May 17, 2016.

*Primary Examiner* — Brian Butcher
(74) *Attorney, Agent, or Firm* — Mattingly & Malur, PC

(57) ABSTRACT

To provide an optical information recording and reproducing apparatus capable of correct positioning, in an optical information recording and reproducing apparatus which branches a light beam into reference light and signal light to cause interference and records an obtained interference fringe as a hologram on an optical information recording medium and reproduces the hologram recorded by applying the reference light onto the optical information recording medium, the apparatus has an image pickup element which detects reproduction light passing through an aperture 101 in reproduction light obtained by applying the reference light onto the optical information recording medium and generates a reproduction signal, photo detectors 104a, 104b, 104c, and 104d that are different from the image pickup element and detect reproduction light applied on a location on the periphery of the aperture 101, and a computing unit which computes a position error signal based on outputs from the photo detectors.

13 Claims, 15 Drawing Sheets

(51) Int. Cl.
- *G11B 7/09* (2006.01)
- *G11B 7/08* (2006.01)
- G11B 7/00 (2006.01)
- G03H 1/26 (2006.01)
- G03H 1/22 (2006.01)
- G11B 7/085 (2006.01)

(52) U.S. Cl.
CPC ..... *G03H 1/265* (2013.01); *G03H 2001/2207* (2013.01); *G11B 7/08564* (2013.01); *G11B 2007/0009* (2013.01); *G11B 2007/00656* (2013.01)

(56) References Cited

U.S. PATENT DOCUMENTS

| | | | |
|---|---|---|---|
| 2006/0153044 | A1 | 7/2006 | Hayashi et al. |
| 2008/0088897 | A1* | 4/2008 | Hayashi ............... G11C 13/042 359/24 |
| 2009/0290472 | A1 | 11/2009 | Nakamura |
| 2010/0271921 | A1* | 10/2010 | Shimada ................. G03H 1/02 369/103 |

FOREIGN PATENT DOCUMENTS

| | | |
|---|---|---|
| JP | 2006-171589 A | 6/2006 |
| JP | 2008-96755 A | 4/2008 |
| JP | 2009-283033 A | 12/2009 |

\* cited by examiner

FIG. 11
(a)
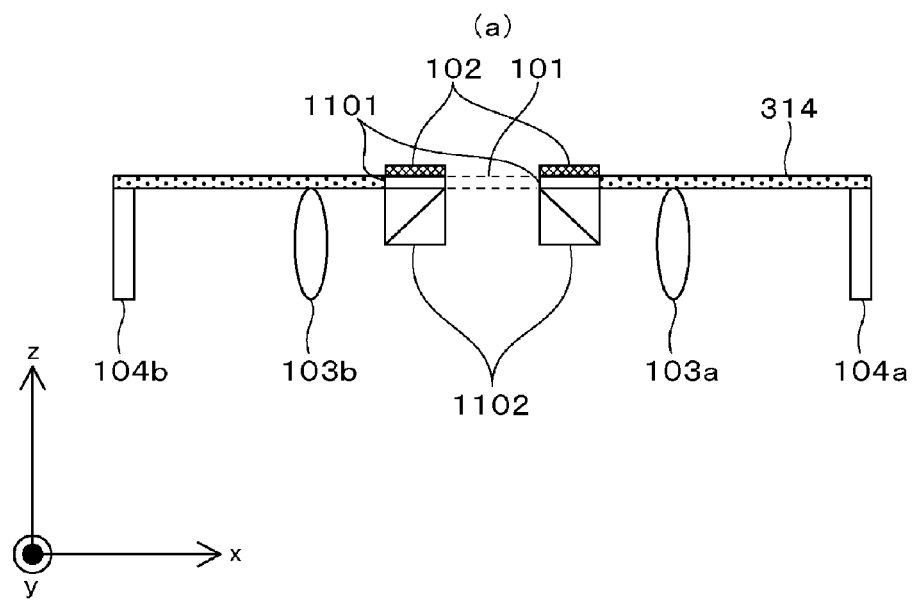
(b)
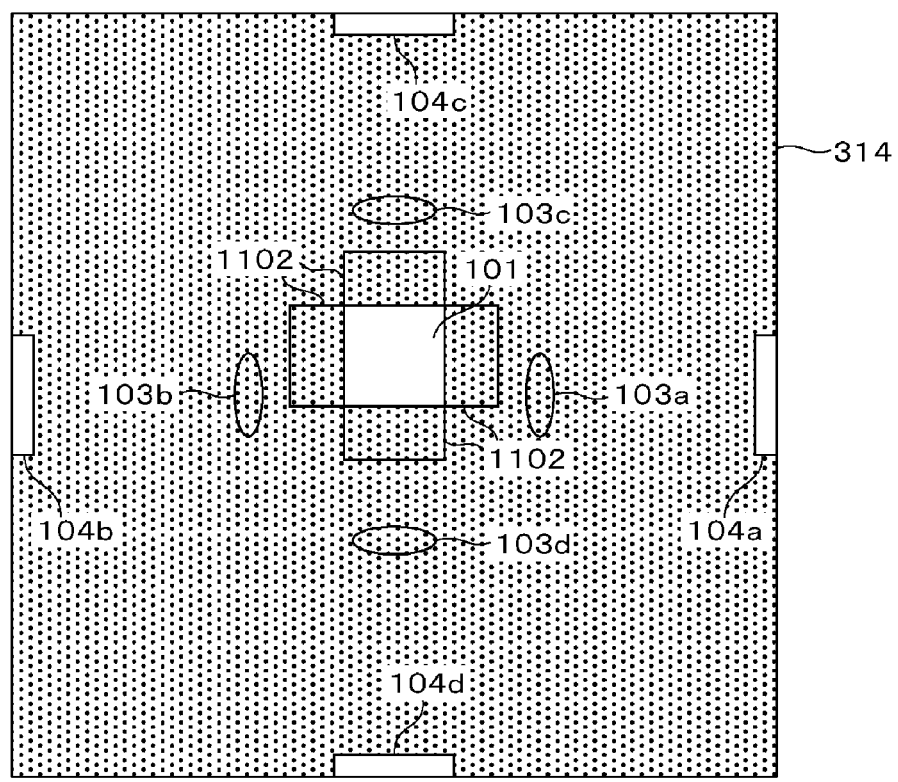

FIG. 12
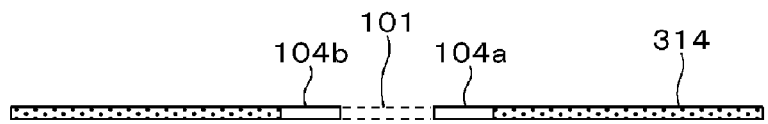
(a)
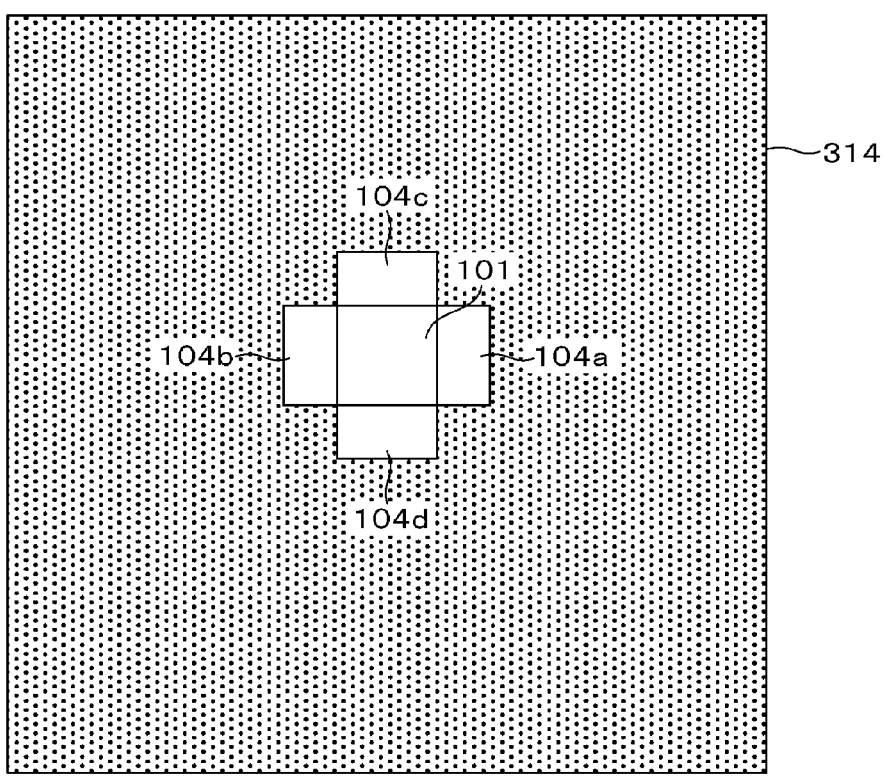
(b)

FIG. 13
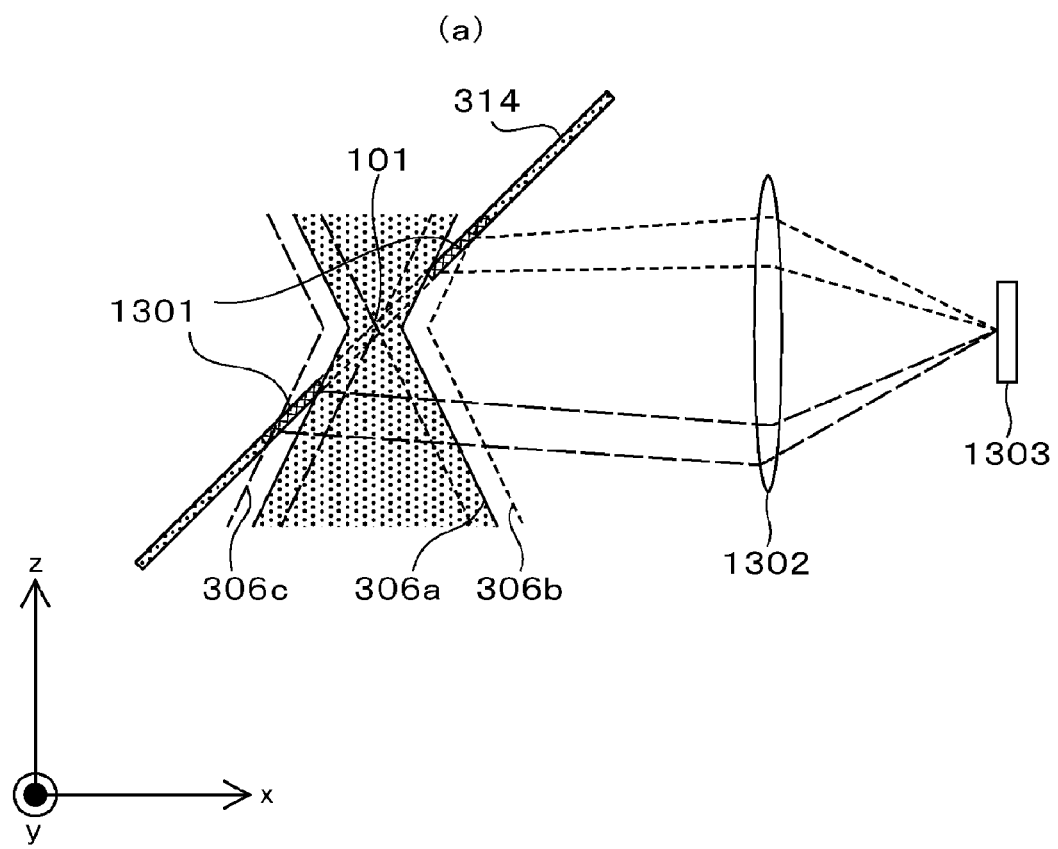
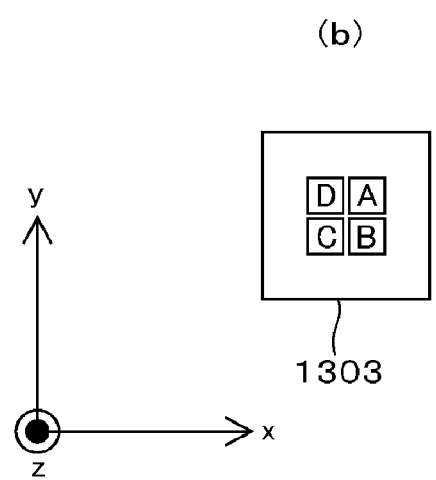

OPTICAL INFORMATION RECORDING AND REPRODUCING APPARATUS AND OPTICAL INFORMATION RECORDING AND REPRODUCING METHOD

TECHNICAL FIELD

The present invention relates to an optical information recording and reproducing apparatus and optical information recording and reproducing method for recording information on an optical information recording medium and reproducing the information from the optical information recording medium, by using holography.

BACKGROUND ART

With the Blu-ray Disc™ standards using blue-violet semiconductor lasers, it has currently become possible, even for consumer use, to commercialize optical disks having a recording density on the order to 50 GB. In future, a large capacity equivalent to a HDD (Hard Disk Drive) capacity of 100 GB to 1 TB is desired even for optical disks.

However, to achieve such extra-high density in optical disk, a densification technology by a new technique different from a densification technology by shortening a wavelength and increasing NA of an objective lens.

While next-generation storage technologies are being studied, hologram recording technology for recording digital information by using holography has attracted attention.

Hologram recording technology is a technology of recording information on a recording medium by superposing signal light having information regarding page data two-dimensionally-modulated by a spatial light modulator (SLM) on reference light inside a recording medium and causing refractive index modulation in the recording medium by an interference fringe pattern occurring at that time.

At the time of reproducing information, reference light used at the time of recording is applied onto the recording medium, thereby causing a hologram recorded on the recording medium to act as a diffraction grating to cause diffracted light. This diffracted light is reproduced as the same light including the recorded signal light and phase information.

The reproduced signal light is two-dimensionally detected at high speed by using an image pickup element such as a CMOS or CCD. In this manner, the hologram recording technology allows two-dimensional information to be recorded on a recording medium by one hologram at a dash and furthermore allows this information to be reproduced. And, since a plurality of pieces of page data can be overwritten at a location on a recording medium, high-capacity and high-speed information recording and reproduction can be achieved.

An example of the hologram recording technology is disclosed in Japanese Patent Application Laid-Open No. 2004-272268 (PTL 1). This gazette describes as follows: "a multiplexing method and apparatus are disclosed in which holograms are spatially multiplexed by partial and spatial overlapping of the holograms between adjacent stacks. Each stack can further take full advantage of another multiplexing technology, for example, angle, wavelength, phase coding, peristrophic, or fractal multiplexing. The amount equal to the beam waist of signal light for writing a hologram separates the respective stacks of the holograms. At the time of reproduction, a hologram and a hologram adjacent to that hologram are all simultaneously read. With a filter arranged to the beam waist of the reproduced data, the read adjacent hologram is not transmitted to a camera surface. Alternatively, this unwanted reproduction can be filtered by an angular filter on an intermediate surface in an optical system with a limited angle passband".

Also, an example of a background technology in the present technical field is disclosed in PTL 2. This document describes, as a problem, "an object is to provide a medium for hologram memory in which a light spot for recording data can be accurately applied onto a recording medium" and, as a solution, "a medium for hologram memory is provided in which the medium for hologram memory is configured of a data recording area and a servo information area to allow a light spot for recording data to be accurately applied onto a recording medium".

CITATION LIST

Patent Literatures

PTL 1: Japanese Patent Application Laid-Open No. 2004-272268
PTL 2: Japanese Patent Application Laid-Open No. 2005-196826

SUMMARY OF INVENTION

Technical Problem

Meanwhile, in the optical information recording and reproducing apparatus using hologram recording technology, to reproduce information recorded on a recording medium at high speed, it is required to detect a reproducing position of the recording medium with high accuracy and perform correct positioning. Also, when data is reproduced in different drive apparatuses, each drive apparatus has a different decentering amount, and therefore correct positioning control with respect to a reproducing position is demanded.

For this demand, in PTL 2, a servo information area is provided to the optical information recording medium, thereby allowing positioning control. Thus, bearing future high-speed reproduction and densification in mind, the inventors have studied this technology in detail. As a result, in the technology described in PTL 2, it has been found that there are problems in recording capacity and cost. That is, in PTL 2, since servo information area for positioning is provided, an area for recording signals is decreased, thereby decreasing storage capacity. Moreover, compared with a conventional optical information recording medium, in the case of the structure described in PTL 2, the number of processes at the time of medium manufacture is increased, and therefore an increase in cost is not avoidable.

An object of the present invention is to provide an optical information recording and reproducing apparatus and optical information recording and reproducing method allowing correct positioning without newly providing a recording medium with a servo information area even when hologram recording technology is used.

Solution to Problems

The above-described problem is solved by the invention described in the scope of claims for patent. An optical information recording and reproducing apparatus of the present invention records information on an optical information recording medium by using holography and reproduces the information from the optical information recording medium, includes a light source which emits a light beam, a branching element which branches the light beam emitted from the light source into signal light and reference light, a spatial light modulator for adding information to the signal light, an objective lens for applying the signal light onto the optical information recording medium, and an image pickup element for detecting diffracted light generated from a recording area in the optical information recording medium when the reference light is applied onto the optical information recording medium, and further includes a photo detector which is different from the image pickup element and detects the diffracted light generated from the recording area in the optical information recording medium when the reference light is applied onto the optical information recording medium, wherein, by using a signal detected by the photo detector, a position error signal of the optical information recording medium with respect to the objective lens is generated.

Advantageous Effects of Invention

According to the present invention, it is possible to provide a highly-reliable optical information recording and reproducing apparatus and optical information recording and reproducing method allowing correct positioning without newly providing a recording medium with a servo information area.

BRIEF DESCRIPTION OF DRAWINGS

FIG. 11 depicts schematic views of a spatial filter in a pickup in an optical information recording and reproducing apparatus according to Example 2 of the present invention, where (a) depicts a cross sectional view of an aperture 101 in an x direction line passing through the center and (b) depicts a plan view viewed from an optical information recording medium 1 side.

FIG. 12 depicts schematic views of a spatial filter in a pickup in an optical information recording and reproducing apparatus according to Example 3 of the present invention, where (a) depicts a cross sectional view of an aperture 101 in an x direction line passing through the center and (b) depicts a plan view viewed from an optical information recording medium 1 side.

FIG. 13 depicts schematic views of main parts of an optical information recording and reproducing apparatus according to Example 4 of the present invention (position error detection in x and Y directions), where (a) depicts a light beam diagram of reproduction light near a spatial filter in a pickup and (b) depicts a plan structural view of light-receiving units of a photo detector.

DESCRIPTION OF EMBODIMENTS

Figure 1:
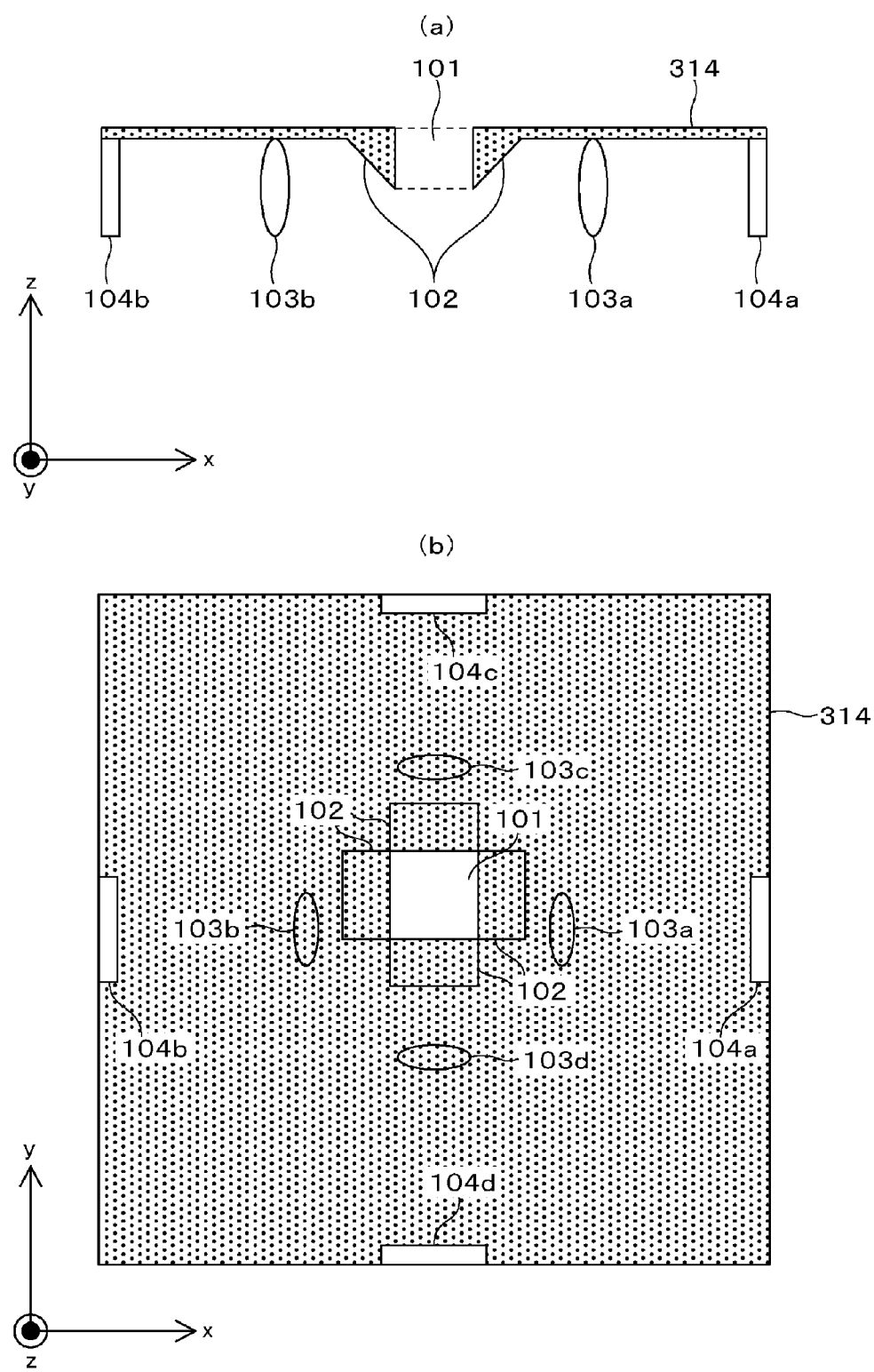
FIG. 1 depicts schematic diagrams of a spatial filter in a pickup in an optical information recording and reproducing apparatus according to Example 1 of the present invention, where (a) depicts a sectional view in an x-direction line passing through the center of an aperture 101 and (b) depicts a plan view when viewed from an optical information recording medium 1 side.

Embodiments of the present invention are described by using the drawings.

EXAMPLE 1

Example 1 of the present invention is described by using FIG. 1 to FIG. 9 and FIG. 15. Note that the same reference character in the drawings indicates the same component.

Figure 2:
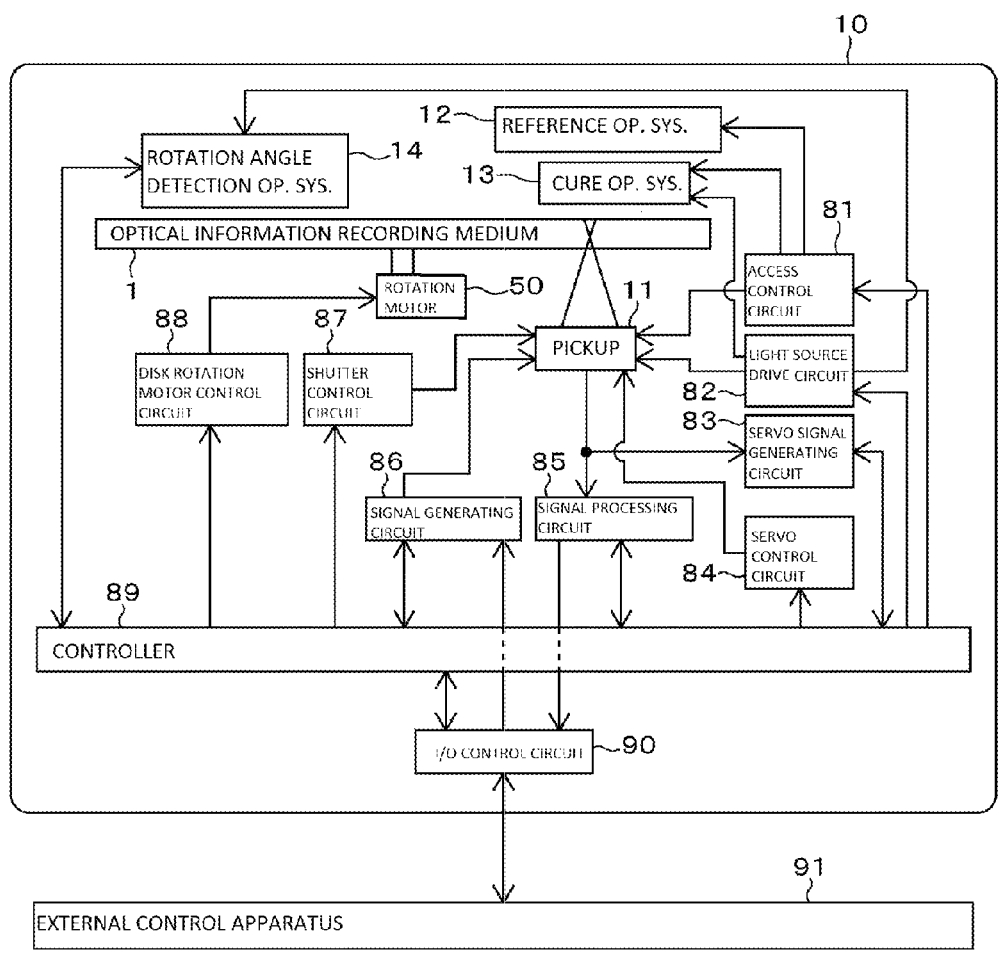
FIG. 2 is a block diagram depicting an entire schematic structure of the optical information recording and reproducing apparatus according to Example 1 of the present invention.

First, an entire structure of an optical information recording and reproducing apparatus is described. FIG. 2 is a diagram for describing the entire structure of the optical information recording and reproducing apparatus according to the present embodiment, and is a block diagram depicting a recording and reproducing apparatus for an optical information recording medium, the apparatus which records and/or reproduces digital information by using holography.

An optical information recording and reproducing apparatus 10 is connected via an input/output control circuit 90 to an external control apparatus 91. When recording, the optical information recording and reproducing apparatus 10 receives information signal to be recorded from the external control apparatus 91 through the input/output control circuit 90. When reproducing, the optical information recording and reproducing apparatus 10 transmits the reproduced information signal through the input/output control circuit 90 to the external control apparatus 91.

The optical information recording and reproducing apparatus 10 includes a pickup 11, an optical system of reference beam for reproducing signal beam 12, a cure optical system 13, a disk rotation angle detection optical system 14, and a rotation motor 50, and a disk-shaped optical information recording medium 1 is configured to be rotatable by a rotation motor 50.

The pickup 11 plays a role of emitting reference light and signal light to the optical information recording medium 1 and recording digital information on a recording medium by using holography. Here, the information signal to be recorded is sent by a controller 89 via a signal generating circuit 86 to a spatial light modulator, which will be described further below, in the pickup 11, and the signal light is modulated by the spatial light modulator. When the information recorded on the optical information recording medium 1 is reproduced, a light wave for causing reference light emitted from the pickup 11 to enter the optical information recording medium in a direction reverse to that at recording is generated at the optical system of reference beam for reproducing signal beam 12. The reproduction light reproduced with reproduction-purpose reference light is detected by an image pickup element, which will be described further below, in the pickup 11, and a signal is reproduced by a signal processing circuit 85.

Application time for applying the reference light and the signal light to the optical information recording medium 1 can be adjusted by controlling opening/closing time of a shutter, which will be described further below, in the pickup 11 by the controller 89.

The cure optical system 13 plays a role of generating a light beam for use in pre-cure and post-cure of the optical information recording medium 1. Pre-cure is a pre-process of applying a predetermined light beam in advance before the reference light and the signal light are applied onto desired positions, when information is recorded at a desired position in the optical information recording medium 1. Post-cure is a post-process of applying a predetermined light beam, after recording information at a desired position in the optical information recording medium 1 so as to disable additional write at the desired position.

The disk rotation angle detection optical system 14 is used to detect a rotation angle of the optical information recording medium 1. When the optical information recording medium 1 is adjusted at a predetermined rotation angle, a signal according to the rotation angle is detected by the disk rotation angle detection optical system 14 and, by using the detected signal, the rotation angle of the optical information recording medium 1 can be controlled by the controller 89 via a disk rotation motor control circuit 88.

Also, the pickup 11 and the cure optical system 13 is provided with a mechanism capable of sliding their position in a radius direction of the optical information recording medium 1, and positional control is performed via an access control circuit 81. Alternatively, the optical information recording and reproducing apparatus 10 is provided with a mechanism which slides the position of the optical information recording medium 1 in a radius direction, and positional control is performed via the access control circuit 81.

A predetermined light source drive current is supplied from a light source drive circuit 82 to light sources in the pickup 11, the cure optical system 13, and the disk rotation angle detection optical system 14, and a predetermined amount of a light beam can be emitted from each light source.

Meanwhile, in recording technology using the principles of holography angle multiplexing, tolerance with respect to a deviation of an angle of reference light tends to be extremely small.

Therefore, a mechanism which detects a deviation amount of the angle of reference light is provided in the pickup 11, a signal for servo control is generated at a servo signal generating circuit 83, and a servo mechanism for correcting the deviation amount via a servo control circuit 84 is provided in the optical information recording and reproducing apparatus 10.

Also, the pickup 11, the cure optical system 13, and the disk rotation angle detection optical system 14 may be simplified by bring several optical system structures or all optical system structures together into one.

Figure 3:
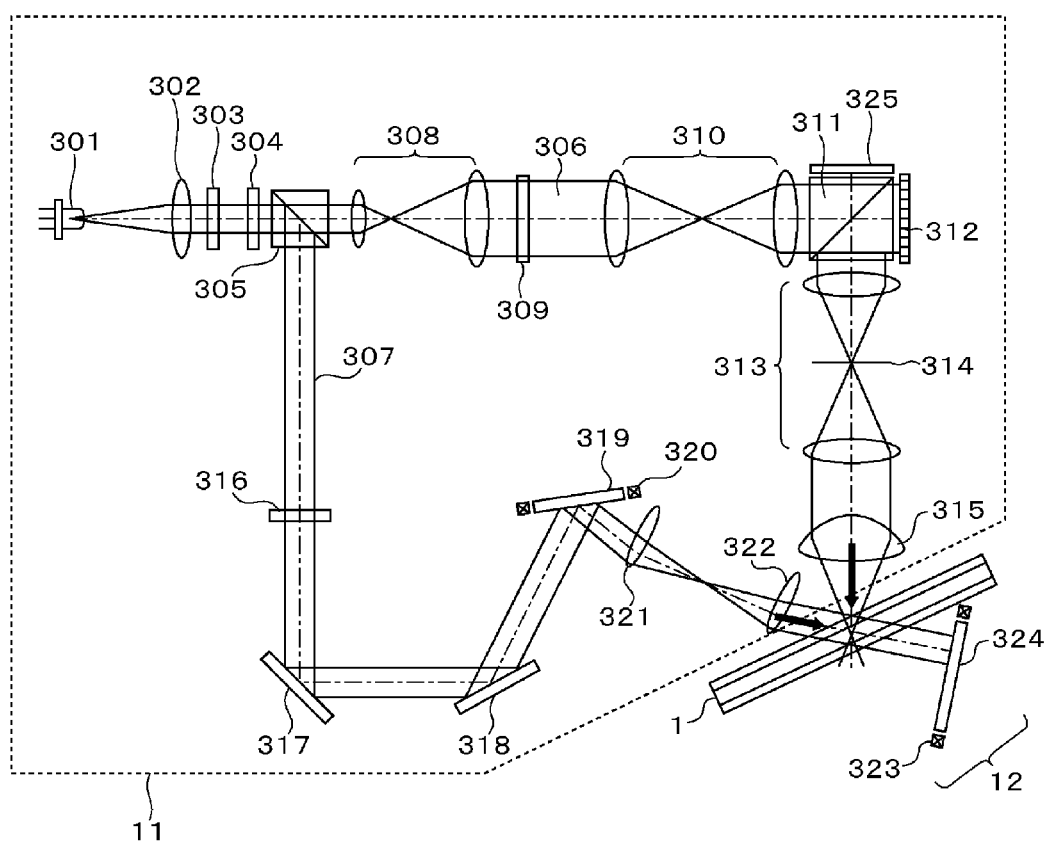
FIG. 3 is a schematic diagram of an example of the structure of a pickup in the optical information recording and reproducing apparatus according to Example 1 of the present invention for describing recording principles.

Next, the structure of the pickup is described. FIG. 3 is a schematic diagram depicting an example of a basic optical system structure of the pickup 11 in the optical information recording and reproducing apparatus 10 according to the present embodiment, and recording principles are described by using this drawing. A light beam emitted from a light source 301 passes through a collimating lens 302 to enter a shutter 303. When the shutter 303 is open, the light beam passes through the shutter 303 and then its polarizing direction is controlled according to a recording operation or reproducing operation so that a ratio in quantity of light between P-polarized light and S polarized light is a desired ratio by an optical element 304 configured of, for example, a ½ wave plate. Then, the light beam enters a polarizing beam splitter 305.

In the present embodiment, the light beam is converted to P-polarized light and S-polarized light at recording and S polarized light at reproduction.

The light beam passing through the polarizing beam splitter 305 acts as signal light 306, is expanded by a beam expander 308 so as to have a desired beam diameter, and then passes through a phase mask 309, a relay lanes 310, and a polarizing beam splitter 311 to enter the spatial light modulator 312. The spatial light modulator 312 is an optical element which adds information signal such as two-dimensional image data to the signal light. An example of structure is such that microelements which perform polarizing conversion (P polarization to S polarization) are two-dimensionally arranged and each element is driven according to information signal to be recorded.

The signal light added with information by the spatial light modulator 312 is reflected from the polarizing beam splitter 311 to propagate through a relay lens 313 and a spatial filter 314. Then, the signal light is gathered by an objective lens 315 at the optical information recording medium 1.

On the other hand, the light beam reflected from the polarizing beam splitter 305 acts as reference light 307, and is set by a device 316 which controls the direction of light polarization to a predetermined polarizing direction according to recording or reproduction. In the present embodiment, it is assumed that conversion to S-polarized light is performed at recording and conversion to P-polarized light is performed at reproduction. Then, the reference light enters a galvanomirror 319 via a mirror 317 and a mirror 318. Since the angle of the galvanomirror 319 can be adjusted by an actuator 320, the incident angle of the reference light entering the optical information recording medium 1 after passing through a lens 321 and a lens 322 can be set at a desired angle. Note that in place of the galvanomirror, an element which converts the wavefront of the reference light may be used to set the incident angle of the reference light.

In this manner, by causing the signal light and the reference light in the optical information recording medium 1 to enter so as to be superposed each other, an interference fringe pattern is formed in the recording medium. By writing this pattern in the recording medium, information is recorded. Also, since the incident angle of the reference light entering the optical information recording medium 1 can be changed by the galvanomirror 319, recording by angle multiplexing can be performed.

Hereinafter, in holograms recorded with their angles of the reference light changed in the same area, a hologram corresponding to each angle of the reference light is referred to as a "page", and a collection of pages obtained by angle multiplexing in the same area is referred to as a "book".

After information (a page) is recorded on the optical information recording medium 1, the shutter 303 is closed, and information to be recorded next is displayed by the spatial light modular 312. Simultaneously, the galvanomirror 319 rotates by a subtle amount (for example, 0.1 degree) to change the incident angle of the reference light to the optical information recording medium 1. Then, when the shutter 303 opens, as a new page of the same book of the optical information recording medium 1, information to be recorded next is subjected to multiplex recording at an angle different from that of the page recorded previously. Then, when the number of pages reaches a predetermined multiplex number (for example, 200 pages), a move to the next book is performed. In the move to the book, the optical information recording medium 1 is moved by drive means not depicted in the drawing with respect to the position of an objective lens 315. Note that a reference character 323 denotes an actuator, a reference character 324 denotes a galvanomirror, and a reference character 325 denotes an image pickup element.

Figure 4:
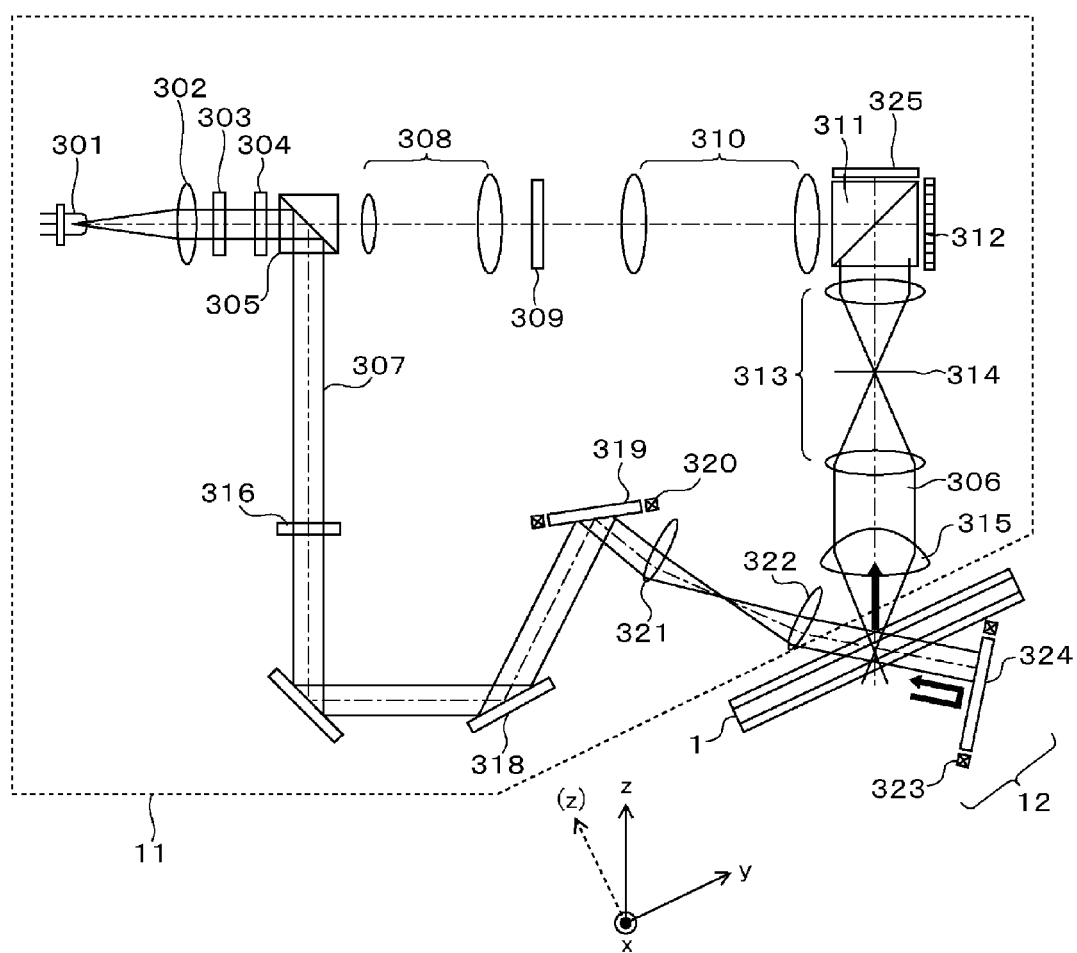
FIG. 4 is a schematic diagram of a pickup with the same structure as that of FIG. 3 for describing reproduction principles.

FIG. 4 is a schematic view for describing reproduction principles with a pickup having the same structure as that of FIG. 3. When recorded information is reproduced, the reference light 307 is caused to enter the optical information recording medium 1 as described above. Then, the reference light passing through the optical information recording medium 1 is caused by an actuator 323 to substantially perpendicularly enter a galvanomirror 324 allowing angle adjustment and be reflected in an opposite direction, thereby being changed to phase conjugate light, and is caused again to enter the optical information recording medium 1 as reference light for reproduction. Note that the actuator 323 and the galvanomirror form the optical system of reference beam for reproducing signal beam 12.

The reproduction light 306 reproduced with this reproduction-purpose reference light propagates through the objective lens 315, the relay lens 313, and the spatial filter 314. Then, the reproduction light 306 passes through the polarizing beam splitter 311 to enter the image pickup element 325, and the recorded signal can be reproduced. As the image pickup element 325, for example, an image pickup element such as a CMOS image sensor or CCD image sensor can be used, but any element can be used as long as the element can reproduce page data.

Figure 6:
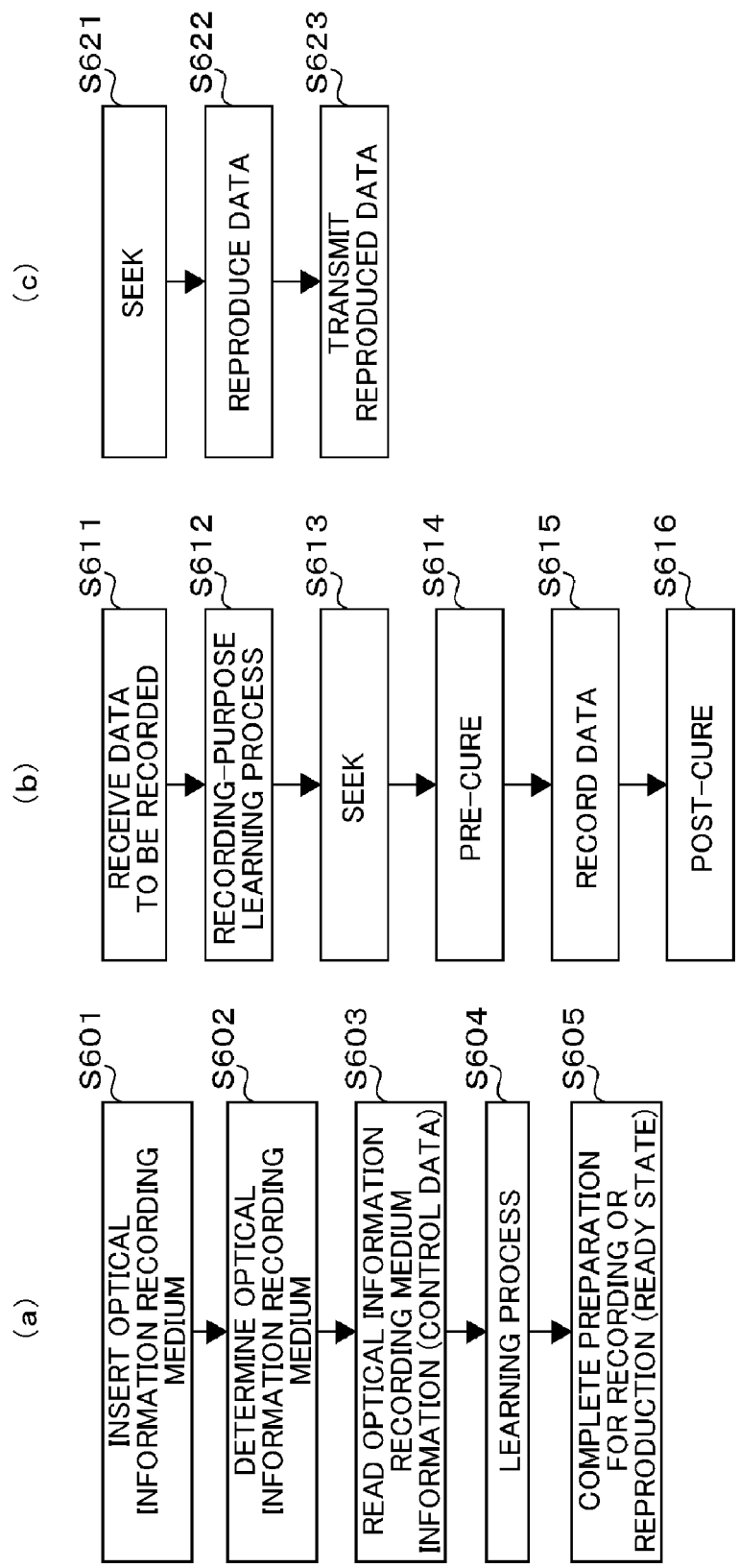
FIG. 6 depicts operation flow diagrams of the optical information recording and reproducing apparatus according to Example 1 of the present invention, where (a) depicts an operation flow diagram after an optical information recording medium is inserted into the optical information recording and reproducing apparatus until preparation of recording or reproduction is completed, (b) depicts an operation flow diagram from a preparation complete state to recording of information on the optical information recording medium, and (c) depicts an operation flow diagram from a preparation complete state to reproduction of information recorded on the optical information recording medium.

Next, recording and reproducing operation flows are described. FIG. 6 depicts recording and reproducing operation flows in the optical information recording and reproducing apparatus 10 according to the present embodiment. Here, in particular, flows regarding recording and reproducing using holography are described.

FIG. 6(a) depicts an operation flow after the optical information recording medium 1 is inserted into the optical information recording and reproducing apparatus 10 until preparation for recording or reproduction is completed, FIG. 6(b) depicts an operation flow from a preparation complete state to recording of information on the optical information recording medium 1, and FIG. 6(c) depicts an operation flow from a preparation complete state to reproduction of information recorded on the optical information recording medium 1.

When an optical information recording medium is inserted as depicted in FIG. 6(a) (S601), the optical information recording and reproducing apparatus 10 makes a determination regarding the optical information recording medium whether, for example, the inserted optical information recording medium is an optical information recording medium for recording or reproducing digital information by using holography (S602).

As a result of determining the optical information recording medium, when it is determined that the optical information recording medium is an optical information recording medium for recording or reproducing digital information by using holography, the optical information recording and reproducing apparatus 10 reads control data provided to the optical information recording medium (S603), and obtains, for example, information regarding the optical information recording medium and, for example, information regarding various setting conditions at recording and reproduction. Note that when the optical information recording medium is a holography-dedicated optical information recording and reproducing apparatus, this determining step (S602) may be omitted.

After the control data is read, various adjustments according to the control data and learning process (S604) regarding the pickup 11 are preformed (S604), and the optical information recording and reproducing apparatus 10 completes preparation for recording or reproduction (S605).

In the operation flow from a preparation complete state until information is recorded, as depicted in FIG. 6(b), data to be recorded is first received (S611), and information according to the data is sent to the spatial light modulator in the pickup 11.

Then, to allow high-quality information to be recorded on the optical information recording medium, various leaning processes for recording are performed in advance as required, such as, for example, power optimization of the light source 301 and optimization of exposure time by the shutter 303 (S612).

Then, in a seek operation (S613), the access control circuit 81 is controlled to set the positions of the pickup 11 and the cure optical system 13 at predetermined positions of the optical information recording medium. When the optical information recording medium 1 has address information, the address information is reproduced, and whether positioning has been made at each target position. If positioning has not been made at a target position, a deviation amount from the predetermined position is calculated, and an operation of positioning is repeated again.

Then, pre-cure is performed on a predetermined area by using a light beam emitted from the cure optical system 13 (S614), and data is recorded by using reference light and signal light emitted from the pickup 11 (S615).

After the data is recorded, post-cure is performed by using a light beam emitted from the cure optical system (S616). The data may be verified as required.

In the operation flow from a preparation complete state until recorded information is reproduced, as depicted in FIG. 6(c), the access control circuit 81 is first controlled with a seek operation (S621) to set the positions of the pickup 11 and the optical system of reference beam for reproducing signal beam 12 at predetermined positions of the optical information recording medium. When the optical information recording medium 1 has address information, the address information is reproduced, and whether positioning has been made at a target position. If positioning has not been made at a target position, a deviation amount from the predetermined position is calculated, and an operation of positioning is repeated again.

Then, reference light is emitted from the pickup 11, the information recorded on the optical information recording medium is read (S622), and reproduced data is transmitted (S623).

Figure 9:
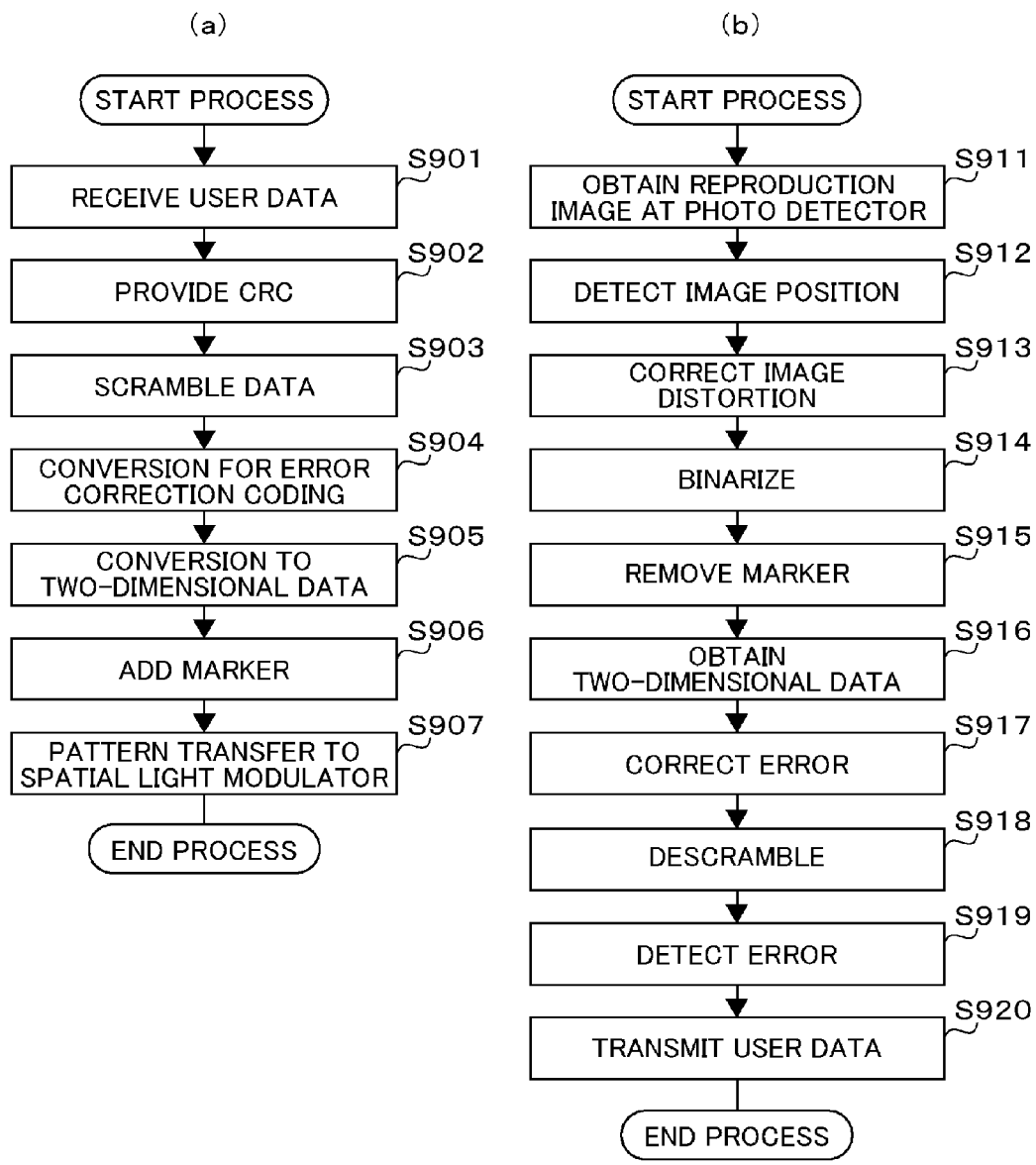
FIG. 9 depicts data processing flow diagrams at the time of recording and reproduction in the optical information recording and reproducing apparatus according to Example 1 of the present invention, where (a) depicts an operation flow diagram of the signal generating circuit and (b) depicts an operation flow diagram of the signal processing circuit.

Next, recording and reproducing operation data processing flows are described. FIG. 9 depicts data processing flow diagrams at the time of recording and reproduction in the optical information recording and reproducing apparatus according to the present embodiment, where FIG. 9(a) depicts a recording data processing flow at the signal generating circuit 86 after reception 611 of (user) data to be recorded at the input/output control circuit 90 until the data is converted to two-dimensional data on the spatial light modulator 312, and FIG. 9(b) is a reproducing data processing flow at the signal processing circuit 85 after detection of two-dimensional data (image to be reproduced) at the image pickup element (photo detector) 325 until transmission of reproduced data at the input/output control circuit 90 (corresponding to S623 of FIG. 6(c)).

Data processing at the time of recording is described by using FIG. 9(a). When user data is received (S901), each data string is subjected to CRC (Cyclic Redundancy Check) (S902) so as to allow error detection to be performed on a plurality of data strings at the time of division and reproduction to make the number of ON pixels and the number of OFF pixels approximately equal to each other, and scrambling (S903) is performed where pseudo random number data string is added to the data strings for the purpose of preventing repetition of the same pattern. Then, error correction coding (S904) is performed such as Reed-Solomon code so as to allow error correction at the time of reproduction. Next, these data strings are converted to two-dimensional data of M×N, which is repeated for one page data to configure two-dimensional data for one page (S905). To thus configured two-dimensional data, a marker is added (S906) as a reference in image position detection or image distortion correction at the time of reproduction, and the data is transferred (S907) to the spatial light modulator 312.

Next, the flow of data processing at the time of reproduction is described by using FIG. 9(b). Image data (image data to be reproduced) detected at the image pickup element (photo detector) 325 is transferred (S911) to the signal processing circuit 85. With reference to the marker included in this image data, an image position is detected (S912), distortions such as the gradient, magnification, and distortion of the image are corrected (S913), and then a binarization process (S914) is performed and the marker is removed (S915), thereby obtaining two-dimensional data for one page (S916). Thus obtained two-dimensional data is converted to a plurality of data strings, and then an error correction process (S917) is performed to remove a parity data string. Next, a descrambling process (S918) is performed, an error detection process by CRC (S919) is performed to delete a CRC parity, and then the user data is transmitted via the input/output control circuit 90 (S920).

Figure 7:
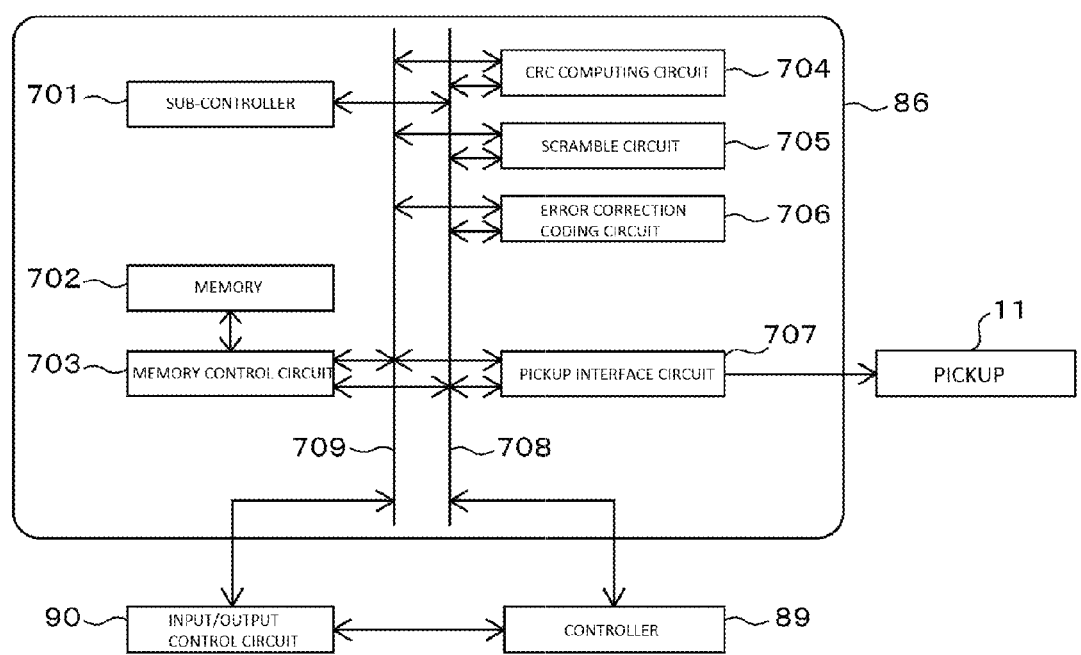
FIG. 7 is a block diagram depicting an example of structure of a signal generating circuit in the optical information recording and reproducing apparatus according to Example 1 of the present invention.

Next, the signal generating circuit is described. FIG. 7 is a block diagram of the signal generating circuit 86 of the optical information recording and reproducing apparatus 10 according to the present embodiment. When the user data is started to be inputted to the input/output control circuit 90, the input/output control circuit 90 notifies the controller 89 that the user data is started to be inputted. Upon reception of this notification, the controller 89 instructs the signal generating circuit 86 to perform a process of recording data for one page inputted from the input/output control circuit 90. The process instruction from the controller 89 goes via a control line 708, and a sub-controller 701 in the signal generating circuit 86 is notified of the instruction. Upon reception of this notification, the sub-controller 701 controls each signal processing circuit via the control line 708 so that each signal processing circuit operates in parallel. First, a memory control circuit 703 is controlled to store the user data inputted from the input/output control circuit 90 via a data line 709 in a memory 702. When the user data stored in the memory 702 reaches a certain amount, a CRC computing circuit 704 performs CRC control on the user data. Next, the data subjected to CRC is scrambled by adding a pseudo random number data string at a scramble circuit 705, and is subjected to error correction coding by adding a parity data string at an error correction coding circuit 706. Lastly, a pickup interface circuit 707 is caused to read the error-correction-coded data from the memory 702 in the order of the two-dimensional data on the spatial light modulator 312, and a marker is added as a reference at the time of reproduction. Then, the two-dimensional data is transferred to the spatial light modulator 312 in the pickup 11.

Figure 8:
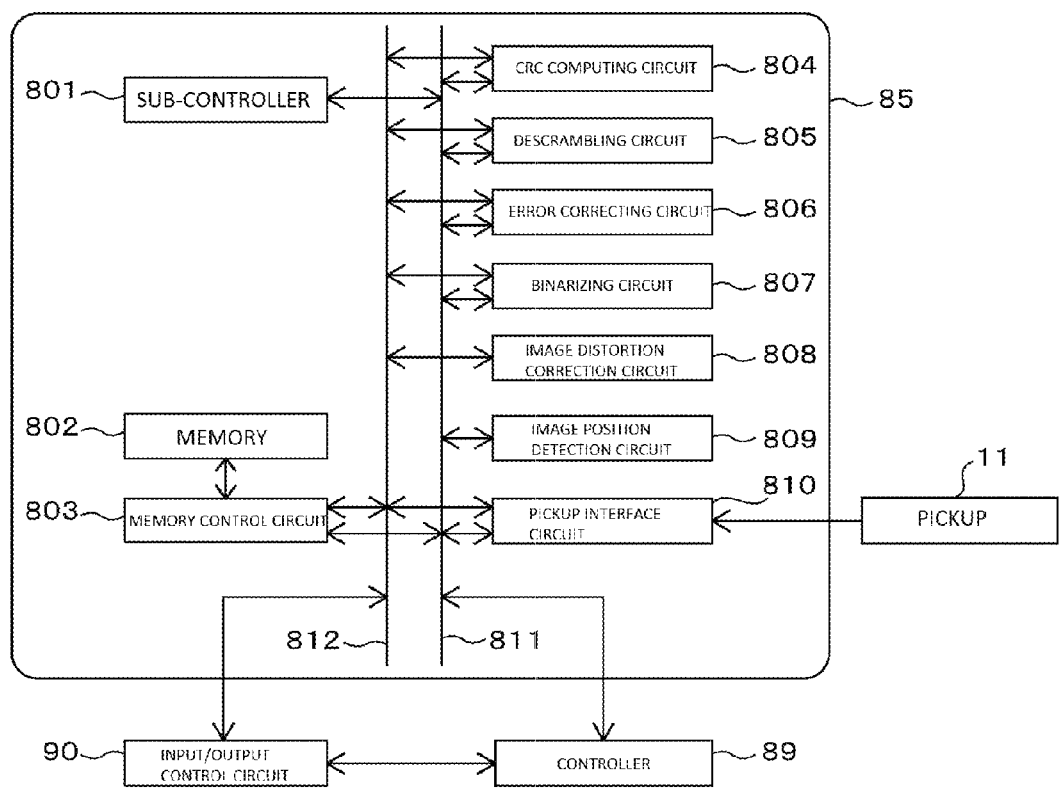
FIG. 8 is a block diagram depicting an example of structure of the signal processing circuit in the optical information recording and reproducing apparatus according to Example 1 of the present invention.

Next, the signal processing circuit is described. FIG. 8 is a block diagram of the signal processing circuit 85 in the optical information recording and reproducing apparatus 10 according to the present embodiment. When the image pickup element 325 in the pickup 11 detects image data, the controller 89 instructs the signal processing circuit 85 to perform a process of reproducing data for one page inputted from the pickup 11. The process instruction from the controller 89 goes via a control line 811, and a sub-controller 801 in the signal processing circuit 85 is notified of the instruction. Upon reception of this notification, the sub-controller 801 controls each signal processing circuit via a control line 811 so as to cause each signal processing circuit to operate concurrently. First, a memory control circuit 803 is controlled via a data line 812 to store image data inputted from the pickup 11 via a pickup interface circuit 810 in the memory 802. When data stored in the memory 802 reaches a certain amount, control is performed such that the marker is detected by an image position detection circuit 809 in the image data stored in the memory 802 and an effective data range is extracted. Next, by using the detected marker, control is performed such that distortions such as the gradient, magnification, and distortion of the image are corrected at the image distortion correction circuit 808 and the image data is converted to an expected size of two-dimensional data. At a binarizing circuit 807, control is performed in which bit data of a plurality of bits configuring the size-converted two-dimensional data are each binarized for determining "0" or "1" and data is stored on the memory 802 in the order of output of the reproduced data. Next, at an error correcting circuit 806, an error included in each data string is corrected. At a descrambling circuit 805, scrambling of adding a pseudo random data string is descrambled. Then, at a CRC computing circuit 804, it is confirmed whether an error is not included in the user data on the memory 802. Then, the user data is transferred from the memory 802 to the input/output control circuit 90.

Next, the structure of the spatial filter 314 for detecting a position error signal is described. A method of detecting a position error signal of the recording medium in the present embodiment is described in detail by using FIG. 1 and FIG. 5. Here, a position error is a deviation of a relative position of the information (hologram) in the optical information recording medium 1 as a reproduction target with respect to the objective lens 315. It is hereinafter assumed that, as depicted in FIG. 4, a direction of recording/reproducing a book on the optical information recording medium 1 (for a disk, for example, a circumferential direction) is an x direction, a direction perpendicular to the x direction in a plane of the optical information recording medium 1 (radius direction) is a y direction, an optical-axis direction (focus direction) of the objective lens 315 or a perpendicular direction of the optical information recording medium 1 is a z direction, and position error signals with respect to the respective directions are SX, SY, and SZ.

FIG. 1 depicts structural diagrams depicting an example of the spatial filter 314 in the pickup 11 in the optical information recording and reproducing apparatus according to the present embodiment, where FIG. 1(*a*) depicts a sectional view of the spatial filter 314 in an x-direction line passing through the center of the aperture 101 and Figure (b) depicts a plan view of the spatial filter 314 when viewed from an optical information recording medium 1 side. The spatial filter 314 is configured to have the aperture 101 at the center and a reflective area 102 on the periphery thereof. Also, on optical paths of reflected light by the reflective area 102, lenses 103*a*, 103*b*, 103*c*, and 103*d* and photo detectors 104*a*, 104*b*, 104*c*, and 104*d* are provided. As depicted in FIG. 4, the reproduction light 306 reproduced by the reproduction-purpose reference light 307 passes through the objective lens 315 as described above, and is gathered by the relay lens 313 to the aperture 101 of the spatial filter 314 from below FIG. 1(*a*).

Figure 5:
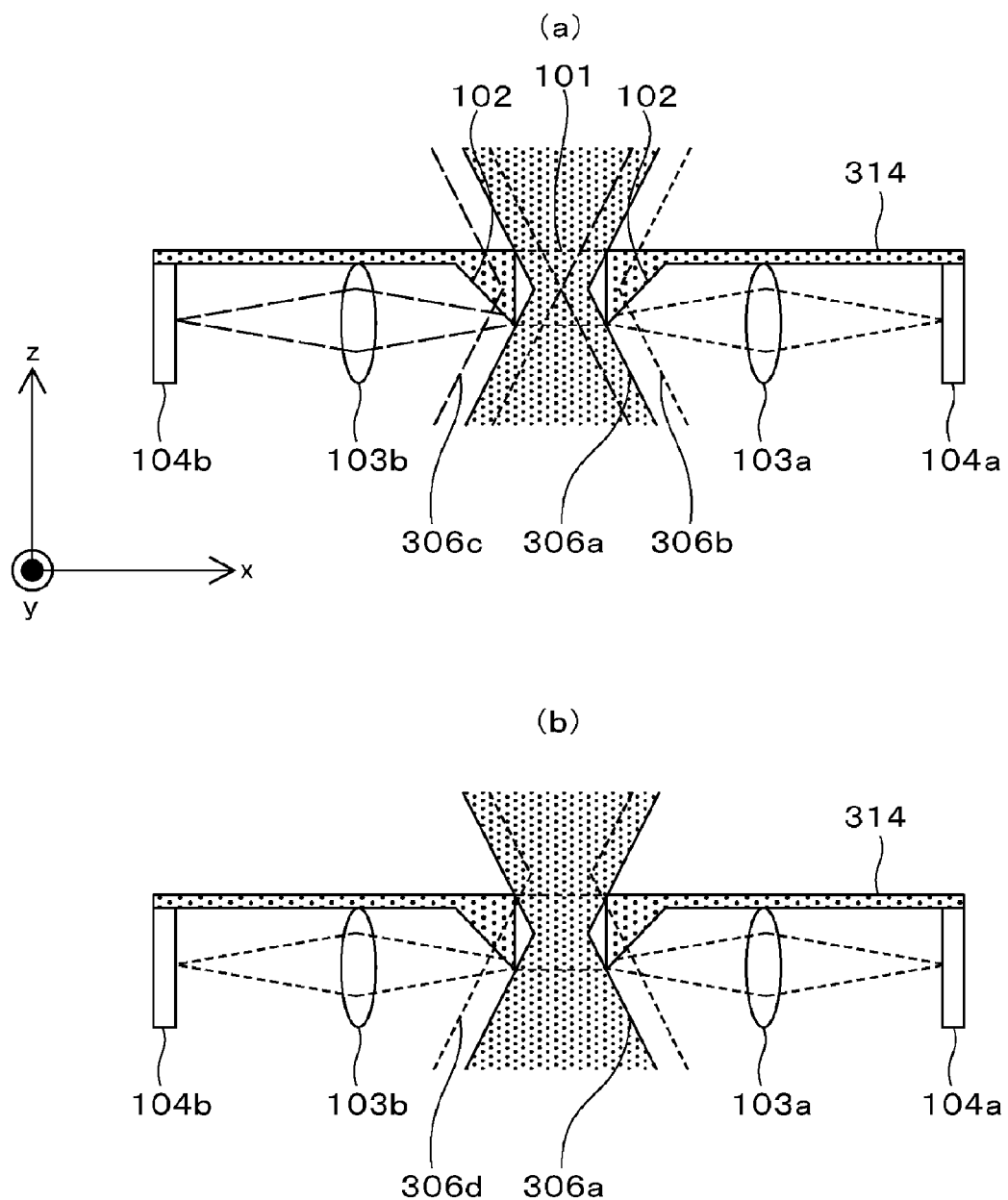
FIG. 5 depicts light beam diagrams of reproduction light near a spatial filter in the pickup in the optical information recording and reproducing apparatus according to Example 1 of the present invention, where (a) depicts the case in which a position error in an x direction (or a position error in a y direction) is present and (b) depicts the case in which a position error in a z direction is present.

FIG. 5 depicts light beam diagrams of the reproduction light 306 on the periphery of the spatial filter 314 in the pickup in the optical information recording and reproducing apparatus according to the present embodiment, where FIG. 5(*a*) depicts a light beam diagram when a position error in the x direction is present (a similar diagram applies to the y direction) and FIG. 5(*b*) depicts a light beam diagram when a position error in a z direction is present. The aperture 101 lets the reproduction light 306*a* pass when a position error is not present. On the other hand, when a position error is present, for example, when a deviation in a forward direction on the x axis is present (306*b*), the reproduction light is reflected from the reflective area 102, passes through the lens 103*a*, and is detected at the photo detector 104*a*. When a deviation in a negative direction on the x axis is present (306*c*), the reproduction light is reflected from the reflective area 102, passes through the lens 103*b*, and is detected at the photo detector 104*b*. Similarly, in the case of a deviation in the y direction, the reproduction light passes through the lens 103*c* (103*d*) and is detected at the photo detector 104*c* (104*d*). Also, when a deviation in the z direction is present (306*d*), the reproduction light is reflected from the reflective area 102, passes through the lenses 103*a*, 103*b*, 103*c*, and 103*d*, and is detected at the photo detectors 104*a*, 104*b*, 104*c*, and 104*d*. In this manner, when a position error of the information (hologram) in the optical information recording medium 1 to be reproduced is present with respect to the objective lens 315, reflected light of the reproduction light 306 at the reflective area 102 of the spatial filter 314 is detected by the photo detectors 104*a*, 104*b*, 104*c*, and 104*d*.

Here, signals obtained from the photo detectors 104*a*, 104*b*, 104*c*, and 104*d* are assumed to be A, B, C, and D. The position error signals SX, SY, and SZ are obtained from the following equations, respectively.

$$SX = A - C \quad (1)$$

$$SY = B - D \quad (2)$$

$$SZ = A + B + C + D \quad (3)$$

The computations for the above-described position error signals is performed at, for example, the servo signal generating circuit 83 of the optical information recording and reproducing apparatus. And, positioning control is performed on, for example, the optical information recording medium 1, the pickup 11 or the objective lens 315, the spatial filter 314, and the aperture 101, so that the calculated position error signals are 0.

Note in the present embodiment that while positive outputs are obtained for the signals A to D when a position error occurs, when there is no position error, the reproduction light 306 does not pass through the aperture 101 of the spatial filter 314 to be reflected from the reflective area 102, and therefore the outputs A to D are 0. Furthermore, since the outputs A to D are 0 also when no reproduction light is present, there is a possibility that this case cannot be differentiated from the case in which no position error is present. Thus, for example, positioning control may be performed so that the position error signal is 0 when the quantity of light detected at the image pickup element 325 is equal to or more than a predetermined amount. Alternatively, the position of the optical information recording medium 1, the pickup 11, or the objective lens 315 may be intentionally deviated, and it may be checked whether positive outputs A, B, C, and D occur. When these outputs occur, positioning control may be performed so that the position error signals are 0.

Still further, when reproduction-purpose reference light is applied onto the optical information recording medium 1 having a plurality of books recorded thereon, not only the reproduction light 306 from a hologram in a reproduction-target area present at a focal position of the objective lens 315 but also diffracted light from an adjacent hologram other than that in the reproduction-target area may occur and enter the spatial filter 314. Thus, the structure is desirably such that the reflective area 102 of the spatial filter 314 is only on the periphery of the aperture 101 and an area where diffracted light from an adjacent hologram other than the target on the periphery enters has a reflection factor as low as possible, or diffracted light does not enter the photo detectors 104*a*, 104*b*, 104*c*, and 104*d* by the lenses 103*a*, 103*b*, 103*c*, and 103*d*. For example, a reflective film of metal such as aluminum may be vapor-deposited on the reflective area 102 of the spatial filter 314 so as to have a high reflection factor, and black anodizing process may be performed on its periphery to prevent reflection.

Figure 15:
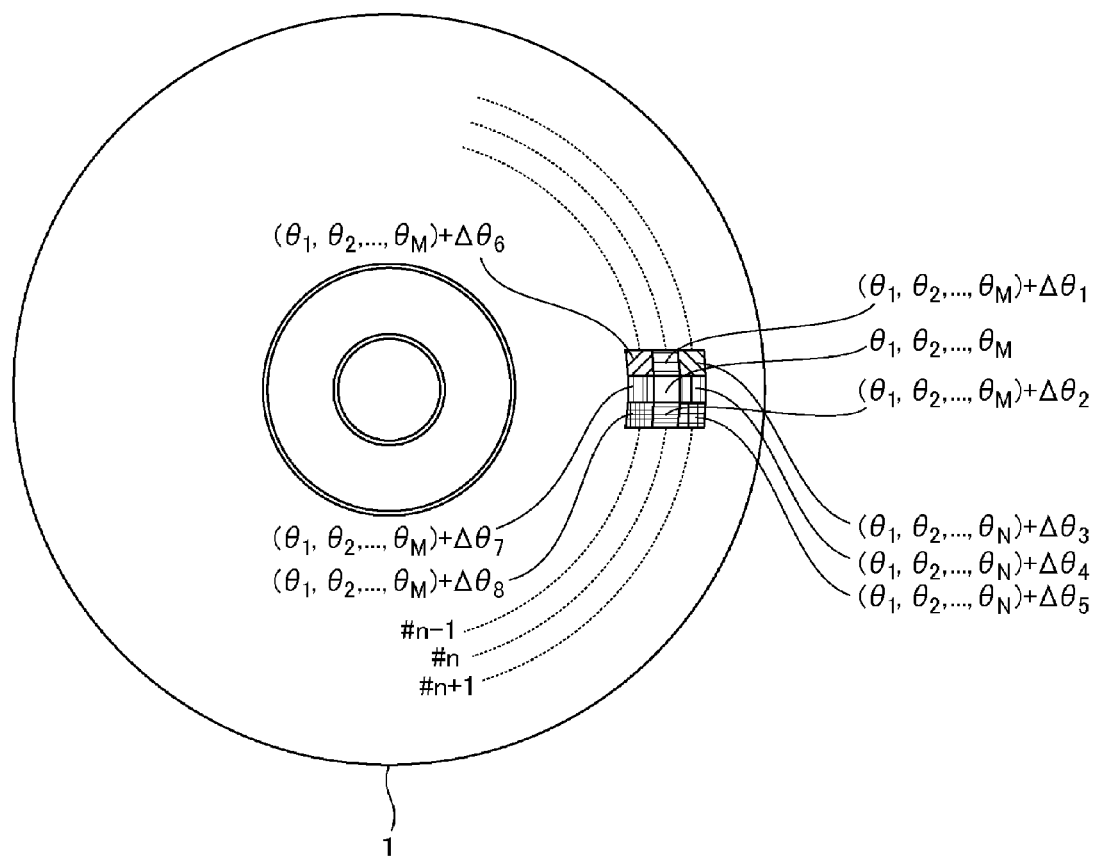
FIG. 15 is a schematic view depicting an example of a hologram angle multiplexing method in an optical system structure in the pickup in the optical information recording and reproducing apparatus according to Example 1 of the present invention.

Still further, when reproduction-purpose reference light is applied onto the optical information recording medium 1 having a plurality of books recorded thereon, and diffracted light from an adjacent hologram other than that in the reproduction-target area also occurs, an angle θ of reference light at the time of angle multiplexing and recording may be gradually shifted for each book so that the diffracted light intensity is relatively small. FIG. 15 depicts an example of a hologram multiplexing scheme in an optical system structure of the pickup 11 according to the present embodiment. In this embodiment, the case is described in which a hologram is recorded on the disk-shaped optical information recording medium 1 along a concentric track. Also, the case is described in which the incident plane of each of the signal light and the reference light are parallel to a circumferential direction of the disk-shaped optical information recording medium.

When a set of incident angles of the reference light with respect to the disk-shaped optical information recording medium at the time of recording a hologram at a certain position on the disk-shaped optical information recording medium is represented as $\{θ\}$, the incident angle $\{θ\}$ of the reference light with respect to the disk-shaped optical information recording medium is gradually shifted according to the position (radius r and azimuth ϕ) on the disk-shaped optical information recording medium. For example, FIG. 15 depicts eight holograms adjacent to a hologram on the disk-shaped optical information recording medium. It is assumed that an angle multiplicity is M and a hologram at the center is recorded with the incident angle of the reference light with respect to the disk-shaped optical information recording medium being $\{θ\}=[v_1, θ_2, \ldots, θ_M]$. Here, eight adjacent holograms are assumed to be $\{θ\}=[(θ_1, θ_2, \ldots, θ_M)+\Delta θ_i]$ (i=1, 2, \ldots, 8). Here, $\Delta θ_i$ (i=1, 2, \ldots, 8) are not required to all have different values, and are determined with the amount of occurring crosstalk, a changeable range of the reference light angle, a minimum angle change amount, etc. Also, according to this method, in order not to use the incident angle of the reference light equal to the adjacent hologram, at least three sets of incident angles of reference light can suffice, that is, $\{θ\}=[θ_1, θ_2, \ldots, θ_M]$, $[(θ_1, θ_2, \ldots, θ_M)+\Delta θ_1]$, and $[(θ_1, θ_2, \ldots, θ_M)+\Delta θ_2]$. For example, in the arrangement depicted in FIG. 15, by way of example, if three sets of incident angles $\{θ\}$ as $\Delta θ_5=\Delta θ_6=0$, $\Delta θ_4=\Delta θ_8=\Delta θ_1$, $\Delta θ_3=\Delta θ_7=\Delta θ_2$ are prepared, the light amount of diffraction light from adjacent holograms can be sufficiently inhibited.

Regarding switching of the incident angle of the reference light, in order to reduce diffracted light from an adjacent hologram as much as possible, recording and reproduction are performed desirably with the incident angle $\{θ\}$ of reference light of a relevant hologram being such that diffraction efficiency of the adjacent hologram is substantially 0. However, the incident angle of reference light for use in recording and reproduction of the adjacent hologram is not necessarily required to be set at an angle so that diffraction efficiency is 0, and is determined based on the amount of occurring crosstalk, a changeable range of the angle of reference light, a minimum angle change amount, etc. Also, the set $\{θ\}$ of incident angles of reference light may be shifted for, for example, each track, in place of each book.

While the lenses 103a, 103b, 103c, and 103d, the photo detectors 104a, 104b, 104c, and 104d are provided on the spatial filter 314 in the present embodiment, they may be separated from the spatial filter 314 as another structures.

As described above, in the present embodiment, position error signals are generated by using reproduction light not passing through the aperture 101 of the spatial filter 314. Therefore, unlike PTL 2, it is not required to provide the optical information recording medium with servo information area for positioning, and problems of a decrease in recording capacity of a medium and an increase in cost at the time of creating a medium do not occur.

Also, while it can be thought that positioning control is performed by, for example, the image pickup element 325 which the reproduction light 306 enters, a process of detecting an image signal has to be performed in the image pickup element 325. By contrast, in the present embodiment, the photo detectors 104a, 104b, 104c, and 104d each detect only a quantity of light. Therefore, there is an advantage in that high-frequency driving and high-speed control can be performed.

In the present embodiment, as a result of using the optical information recording and reproducing apparatus having the spatial filter depicted in FIG. 1 to record and reproduce information by following the operation flow depicted in FIG. 6, positioning with high accuracy can be made without applying a special process to the optical information recording medium, and densification and high-speed reproduction of the optical information recording medium can be achieved.

In the foregoing, according to the present embodiment, it is possible to provide an optical information recording and reproducing apparatus and optical information recording and reproducing method allowing correct positioning without newly providing the recording medium with a servo information area even when hologram recording technology is used.

EXAMPLE 2

Example 2 of the present invention is described by using FIG. 11. Note that matters described in Example 1 and not described in the present embodiment can be applied also to the present embodiment unless there are special circumstances. In the present embodiment, another example of the spatial filter 314 for generating position error signals by using reproduction light not passing through the aperture 101 of the spatial filter 314. Note that the entire structure, operation flow, etc., of the optical information recording and reproducing apparatus are similar to those of Example 1, and are not described in the present embodiment.

FIG. 11 depicts schematic diagrams of the spatial filter in the pickup in the optical information recording and reproducing apparatus according to the present embodiment, where FIG. 11(a) depicts a cross sectional view of the aperture 101 in the x direction passing through the center and FIG. 11(b) depicts a plan view of the spatial filter 314 viewed from an optical information recording medium 1 side. The spatial filter 314 is configured to have the aperture 101 at the center and the reflective area 102 on the periphery thereof and further have a ¼ wave plate 1101 and a polarizing beam splitter 1102. In a hologram reproducing process depicted in FIG. 4, the reproduction light 306 reproduced with the reproduction-purpose reference light 307, which is P-polarized light, is P-polarized light. When a position error is present, the reproduction light 306 passes through the polarizing beam splitter 1102, is converted by the ¼ wave plate 1101 to circular polarized light, and is then reflected from the reflective area 102. When passing through the ¼ wave plate 1101 again, the reproduction light 306 is converted to S-polarized light, is reflected from the polarizing beam splitter 1102, passes through the lenses 103a, 103b, 103c, and 103d, and are detected at the photo detectors 104a, 104b, 104c, and 104d.

In the present embodiment, as a result of using the optical information recording and reproducing apparatus having the spatial filter depicted in FIG. 11 to record and reproduce information by following the operation flow depicted in FIG. 6, positioning with high accuracy can be made without applying a special process to the optical information recording medium, and densification and high-speed reproduction of the optical information recording medium can be achieved.

Also, since a tilted reflective area is not required to be formed on the periphery of the aperture of the spatial filter and a polarizing beam splitter can be mounted later on a flat area, it is characterized that the spatial filter can be easily created compared with the structure of Example 1.

EXAMPLE 3

Example 3 of the present invention is described by using FIG. 12. Note that matters described in Example 1 and not described in the present embodiment can be applied also to the present embodiment unless there are special circumstances. In the present embodiment, another example of the spatial filter 314 for generating position error signals by using reproduction light not passing through the aperture 101 of the spatial filter 314. FIG. 12 depicts schematic views of a spatial filter in a pickup in an optical information recording and reproducing apparatus according to the present embodiment, where FIG. 12(a) depicts a cross sectional view of the aperture 101 in an x direction line passing through the center and FIG. 12(b) depicts a plan view of the spatial filter 314 viewed from an optical information recording medium 1 side. The structure is such that photo detectors 104a, 104b, 104c, and 104d in place of providing a reflective area on the periphery of the aperture 101 of the spatial filter 314 are provided to detect quantities of light of reproduction light when a position error is present.

Note that when reproduction-purpose reference light is applied onto the optical information recording medium 1 having a plurality of books recorded thereon, not only the reproduction light 306 from a hologram in a reproduction-target area at a focal position of the objective lens 315 but also diffracted light from an adjacent hologram other than that in the reproduction-target area may occur and enter the spatial filter 314. Thus, the photo detectors 104a, 104b, 104c, and 104d are desired to be provided only near the aperture 101 where diffracted light from an adjacent hologram other than the target on the periphery does not enter.

In the present embodiment, as a result of using the optical information recording and reproducing apparatus having the spatial filter depicted in FIG. 12 to record and reproduce information by following the operation flow depicted in FIG. 6, positioning with high accuracy can be made without applying a special process to the optical information recording medium, and densification and high-speed reproduction of the optical information recording medium can be achieved.

Also, since it is not required to provide, on the periphery of the aperture of the spatial filter, a reflective area and an optical system or detecting unit which detects reflected light at the reflective area, it is characterized that the spatial filter can be easily created compared with the structure of Example 2.

EXAMPLE 4

Figure 14:
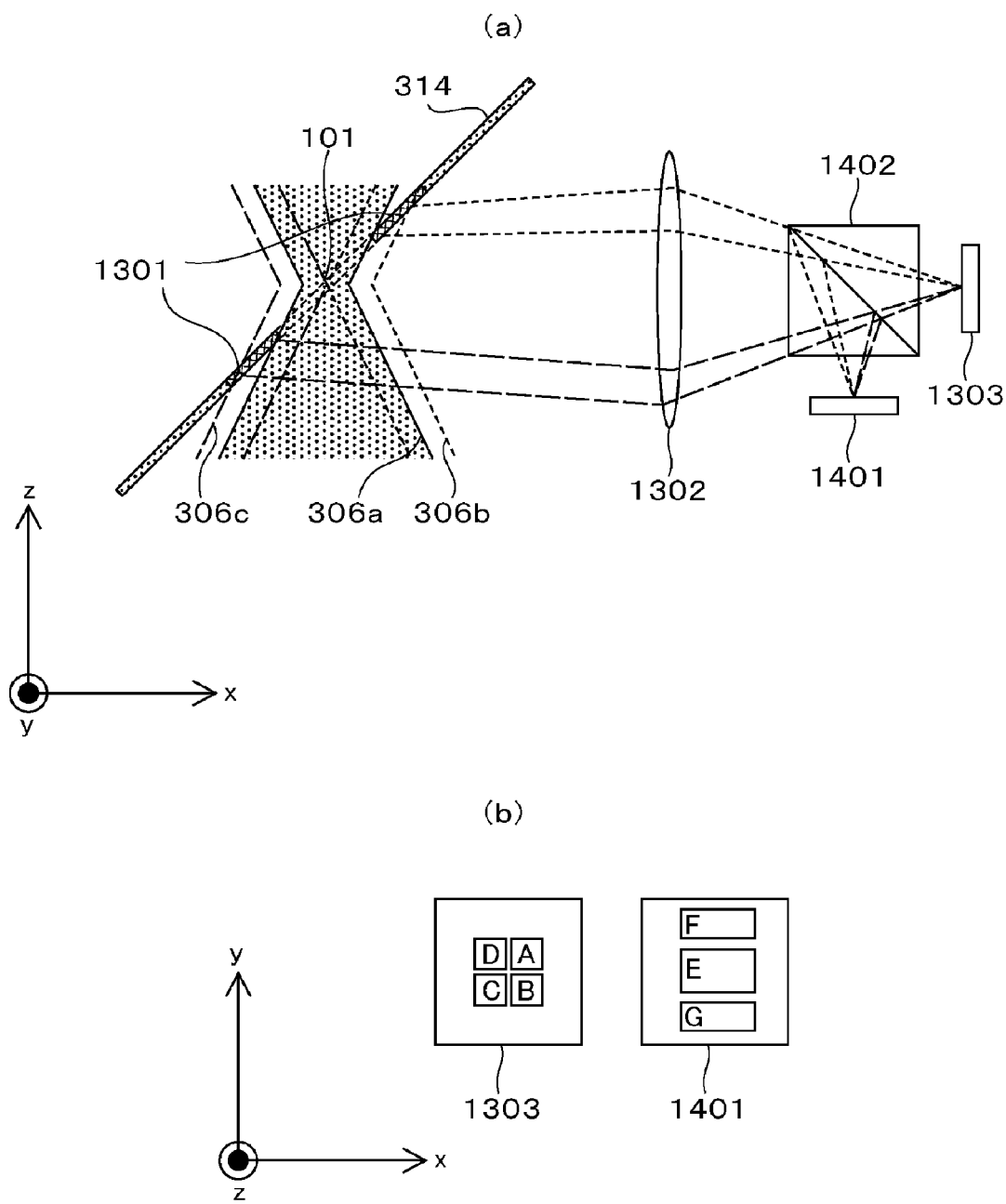
FIG. 14 depicts schematic views of main parts of the optical information recording and reproducing apparatus according to Example 4 of the present invention (position error detection in x and Y directions), where (a) depicts a light beam diagram of reproduction light near a spatial filter in a pickup and (b) depicts a plan structural view of light-receiving units of photo detectors.

Example 4 of the present invention is described by using FIG. 13 and FIG. 14. Note that matters described in Example 1 and not described in the present embodiment can be applied also to the present embodiment unless there are special circumstances. In the present embodiment, another example of the spatial filter 314 for generating position error signals by using reproduction light not passing through the aperture 101 of the spatial filter 314. FIG. 13 depicts schematic views of main parts of an optical information recording and reproducing apparatus (position error detection in the x and Y directions) according to the present embodiment, where FIG. 13(a) depicts a light beam diagram of reproduction light 306a, 306b, and 306c near the spatial filter 314 and FIG. 13(b) depicts a plan structural view of light-receiving units of a photo detector 1303. The spatial filter 314 has the aperture 101 at the center and a reflective area 1301 on the periphery thereof, and further includes a lens 1302 and the photo detector 1303 on a reflected light path of the reproduction light. The photo detector 1303 includes four-way split light-receiving units A, B, C, and D, which are arranged so as to receive a quantity of light of reflected light from the reflective area 1301 of the reproduction light when position errors are present in the x direction and the y direction.

Signals obtained from the light-receiving units A, B, C, and D of the photo detector 1303 are assumed to be A, B, C, and D, respectively. Position error signals SX and SY are respectively obtained from the following equations.

$$SX = (A+B) - (C+D) \quad (4)$$

$$SY = (A+D) - (B+C) \quad (5)$$

Furthermore, the position error signal in the z direction can be detected by using, for example, a spot size method as depicted in FIG. 14. FIG. 14 depicts schematic views of main parts of the optical information recording and reproducing apparatus according to the present embodiment (position error detection in the z-direction position), where FIG. 14(a) depicts a light beam diagram of reproduction light 306a, 306b, and 306c near the spatial filter 314 and FIG. 14(b) depicts a plan structural view of light-receiving units of the photo detectors 1303 and 1401. When a position error is present, reproduction light reflected from the reflective area 1301 passes through the lens 1302, and is branched into two at the beam splitter 1402. One reproduction light after branching is detected by the photo detector 1303, which detects the position error signals SX and SY as shown in Equations (4) and (5). The other reproduction light after branching is detected by the photo detector 1401 including three light-receiving units E, F, and G. Signals obtained from the light-receiving units E, F, and G of the photo detector 1401 are taken as E, F, and G. The position error signal SZ is obtained from, for example, the following equation.

$$SZ = E - (F+G) \quad (6)$$

The computation for the position error signals described above is performed at, for example, the servo signal generating circuit 83 of the optical information recording and reproducing apparatus. And, positioning control is performed on, for example, the optical information recording medium 1, the pickup 11, or the objective lens 315 so that the calculated position error signals is 0.

Figure 10:
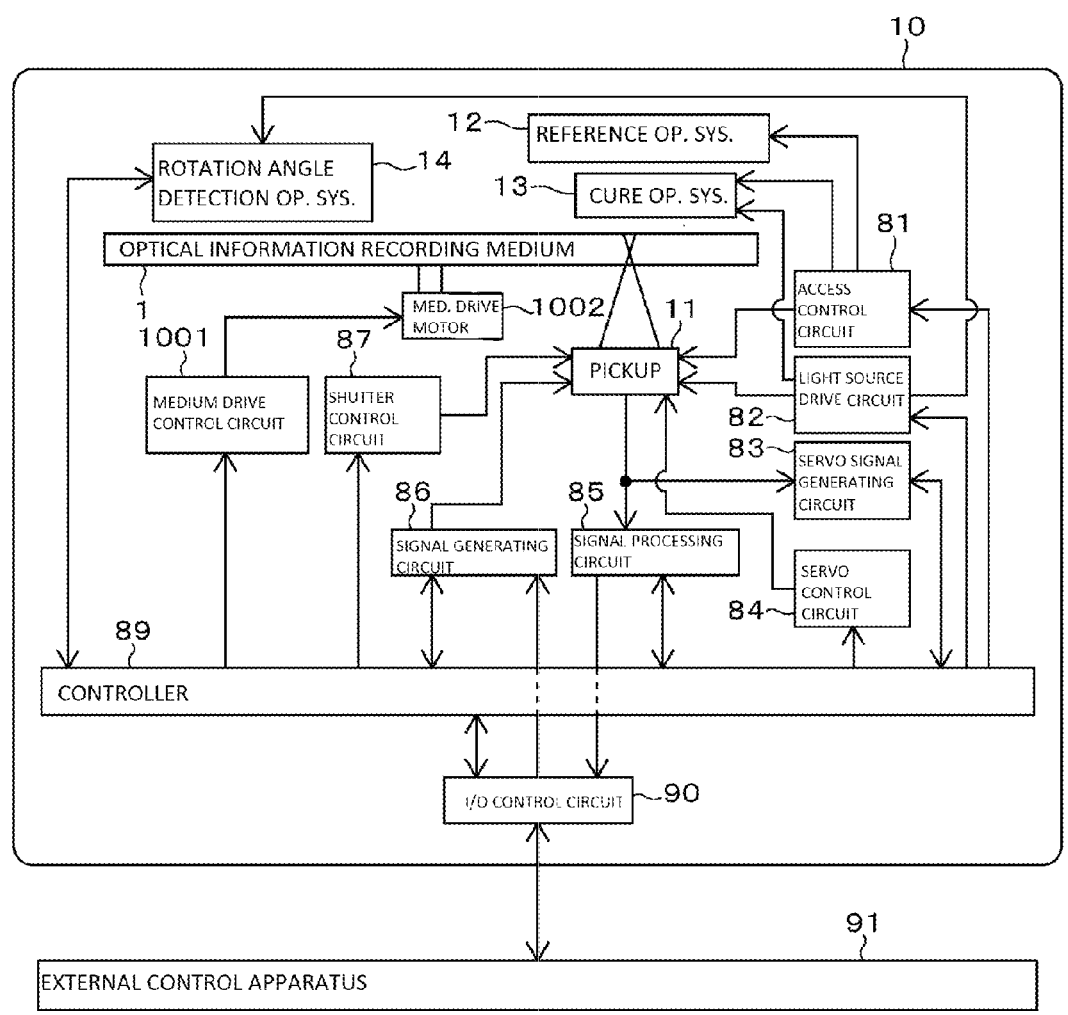
FIG. 10 is a block diagram depicting an entire schematic structure of another optical information recording and reproducing apparatus according to Example 4 of the present invention.

Also, while the optical information recording medium 1 is in a form of a disk shape in the present embodiment, the present invention is not restricted thereto. For example, a card-shaped medium suffices. FIG. 10 depicts an entire structure of an optical information recording and reproducing apparatus when the optical information recording medium 1 in a card shape is used. The optical information recording and reproducing apparatus 10 includes the pickup 11, the optical system of reference beam for reproducing signal beam 12, the cure optical system 13, and a medium drive motor 1002, and the optical information recording medium 1 is configured to be drivable by the medium drive motor 1002 via a medium drive control circuit 1001 by the controller 89. While the structure in FIG. 10 is such that the optical information recording medium 1 is driven, in place of driving the optical information recording medium 1, a mechanism of sliding the positions of the pickup 11 or the objective lens in the pickup 11, the optical system of reference beam for reproducing signal beam 12, the medium cure optical system 13 may be provided to perform positional control via the access control circuit 81.

In the present embodiment, as a result of using the optical information recording and reproducing apparatus having the spatial filter depicted in FIG. 13 and FIG. 14 to record and reproduce information by following the operation flow depicted in FIG. 6, positioning with high accuracy can be made without applying a special process to the optical information recording medium, and densification and high-speed reproduction of the optical information recording medium can be achieved.

Also, since a lens or photo detector can be provided to a location different from the spatial filter, an effect of facilitating assembly and adjustment of the optical system of the pickup compared with the other embodiments.

Note that the present invention is not restricted to the embodiments described above, and include various modification examples. For example, the embodiments described above are described in detail in order to describe the present invention for easy understanding, and are not necessarily restricted to those including all structures described. Furthermore, part of a structure of an embodiment can be replaced with a structure of another embodiment, and a structure of an embodiment can be additionally provided with a structure of another embodiment. Still further, for part of a structure of each embodiment, addition, deletion, and replacement of another structure can be made.

Still further, each of the structures, functions, processing units, processing means, etc. described above may be embodied as hardware by designing an entire or part of these as an integrated circuit. Also, each of the structures, functions, etc. may be embodied as software by a processor interpreting and executing a program achieving each function. Information about a program, table, file, etc. achieving each function can reside on a memory, recording device such as a hard disk or SSD (Solid Stage Drive), or a recording medium such as an IC card, SD card, or DVD.

Furthermore, control lines and information lines necessary for description are depicted, and all control lines and information lines on a product are not necessarily depicted. In practice, it may be considered that almost all structures are mutually connected to each other.

While the present invention of the application has been described in detail by using each embodiment, main modes of the invention are listed below.

(1) An optical information recording and reproducing apparatus which branches a light beam into reference light and signal light to cause interference and records an obtained interference fringe as a hologram on an optical information recording medium and also reproduces the recorded hologram by applying reference light onto the optical information recording medium, the apparatus including:

a pickup having a light source which emits the light beam, a branching element which branches the light beam into the reference light and the signal light, a spatial light modulator for adding information to the signal light, an aperture through the signal light added with the information, an objective lens which applies the signal light passing through the aperture onto the optical information recording medium, an optical system which applies the reference light onto the optical information recording medium, an image pickup element which applies the reference light onto a hologram of a reproduction target formed in the optical information recording medium and detects reproduction light passing through the aperture in the obtained reproduction light and generate a reproduced signal, and a photo detector different from the image pickup element, the photo detector which detects the reproduction light applied on periphery of the aperture in the reproduction light; and a computing unit which computes a position error signal indicating a deviation in position of the optical information recording medium with respect to the objective lens, based on an output from the photo detector different from the image pickup element.

(2) An optical information recording and reproducing method including:

a first step of preparing an optical information recording medium having recorded thereon an interference fringe as a hologram obtained by branching a light beam into reference light and signal light to cause interference;

a second step of reproducing reproduction light by applying the reference light onto the optical information recording medium;

a third step of applying the reproduction light reproduced in the second step via an objective lens onto an aperture for letting the reproduction light from a hologram of a reproduction target formed on the optical information recording medium pass through;

a fourth step of detecting the reproduction light applied on periphery of the aperture; and a fifth step of finding a position error signal indicating a deviation in relative position between a position of the hologram of the reproduction target formed on the optical information recording medium and a position of the objective lens by using the reproduction light detected in the fourth step.

REFERENCE SIGNS LIST

101 . . . aperture, 102 . . . reflective area, 103a, 103b, 103c, and 103d . . . lens, 104a, 104b, 104c, and 104d . . . photo detector, 1 . . . optical information recording medium, 10 . . . optical information recording and reproducing apparatus, 11 . . . pickup, 12 . . . optical system of reference beam for reproducing signal beam, 13 . . . cure optical system, 14 . . . disk rotation angle detection optical system, 50 . . . rotation motor, 81 . . . access control circuit, 82 . . . light source drive circuit, 83 . . . servo signal generating circuit, 84 . . . servo control circuit, 85 . . . signal processing circuit, 86 . . . signal generating circuit, 87 . . . shutter control circuit, 88 . . . disk rotation motor control circuit, 89 . . . controller, 90 . . . input/output control circuit, 91 . . . external control apparatus, 301 . . . light source, 302 . . . collimating lens, 303 . . . shutter, 304 . . . ½ wave plate, 305 . . . polarizing beam splitter, 306 . . . signal light (reproduction light), 306a, 306b, 306c, and 306d . . . reproduction light, 307 . . . reference light, 308 . . . beam expander, 309 . . . phase mask, 310 . . . relay lens, 311 . . . polarizing beam splitter, 312 . . . spatial light modulator, 313 . . . relay lens, 314 . . . spatial filter, 315 . . . objective lens, 316 . . . device which controls the direction of the light polarization, 317 ... mirror, 318 ... mirror, 319 ... galvanomirror, 320 ... actuator, 321 ... lens, 322 ... lens, 323 ... actuator, 324 ... galvanomirror, 325 ... image pickup element, 1001 ... medium drive control circuit, 1002 ... medium drive motor, 1101 ... ¼ wave plate, 1102 ... polarizing beam splitter, 1301 ... reflective area, 1302 ... lens, 1303 ... photo detector, 1401 ... photo detector, 1402 ... beam splitter

The invention claimed is:

1. An optical information recording and reproducing apparatus, which branches a light beam into a reference light and a signal light to cause interference and records an obtained interference fringe as a hologram on an optical information recording medium and also reproduces the recorded hologram by applying the reference light onto the optical information recording medium, the optical information recording and reproducing apparatus comprising:

a pickup having a light source which emits the light beam, a branching element which branches the light beam into the reference light and the signal light, a spatial light modulator for adding information to the signal light, a spatial filter having an aperture through which the signal light with the added information passes, an objective lens which applies the signal light passing through the aperture onto the optical information recording medium, an optical system which applies the reference light onto the optical information recording medium, an image pickup element which detects reproduction light passing through the aperture when the reference light is applied onto a hologram of a reproduction target formed on the optical information recording medium and generates a reproduced signal therefrom, and a photo detector different from the image pickup element, the photo detector detects the reproduction light applied on a periphery of the aperture; and a processor connected to a storage medium that stores instructions that, when executed by the processor, cause the processor to compute a position error signal indicating a deviation in position of the optical information recording medium with respect to the objective lens based on an output from the photo detector, wherein the aperture is disposed to prevent diffracted light coming from a hologram other than the reproduction target formed on the optical information recording medium from being guided to the image pickup element, wherein the spatial filter has a reflective area on the periphery of the aperture on a side where the reproduction light enters, wherein the photo detector is provided at a position different from the image pickup element and the optical information recording medium, and wherein the reflective area is tilted by a predetermined amount with respect to a surface of the spatial filter so as to guide the reproduction light applied on the periphery of the aperture to the photo detector.

2. The optical information recording and reproducing apparatus according to claim 1, wherein the processor causes any of the objective lens, the pickup, the spatial filter, the aperture, and the optical information recording medium to move based on the position error signal.

3. The optical information recording and reproducing apparatus according to claim 1, wherein a plurality of said photo detectors are provided, or the photo detector has a plurality of light-receiving units, and the processor computes the position error signal using a sum or a difference signal among a plurality of signals obtained from the plurality of photo detectors or the plurality of light-receiving units.

4. An optical information recording and reproducing apparatus, which branches a light beam into a reference light and a signal light to cause interference and records an obtained interference fringe as a hologram on an optical information recording medium and also reproduces the recorded hologram by applying the reference light onto the optical information recording medium, the optical information recording and reproducing apparatus comprising:

a pickup having a light source which emits the light beam, a branching element which branches the light beam into the reference light and the signal light, a spatial light modulator for adding information to the signal light, a spatial filter having an aperture through which the signal light with the added information passes, an objective lens which applies the signal light passing through the aperture onto the optical information recording medium, an optical system which applies the reference light onto the optical information recording medium, an image pickup element which detects reproduction light passing through the aperture when the reference light is applied onto a hologram of a reproduction target formed on the optical information recording medium and generates a reproduced signal therefrom, and a photo detector different from the image pickup element, the photo detector detects the reproduction light applied on a periphery of the aperture; and a processor connected to a storage medium that stores instructions that, when executed by the processor, cause the processor to compute a position error signal indicating a deviation in position of the optical information recording medium with respect to the objective lens based on an output from the photo detector, wherein the aperture is provided in the spatial filter to prevent diffracted light coming from a hologram other than the reproduction target formed on the optical information recording medium from being guided to the image pickup element, wherein the spatial filter has a reflective area on the periphery of the aperture on a side where the reproduction light enters, and wherein a reflection factor of the reflective area of the spatial filter is R1, a reflection factor of an area of the spatial filter where diffracted light obtained from the hologram other than the reproduction target enters is R2, and R1>R2.

5. The optical information recording and reproducing apparatus according to claim 4, wherein the processor causes any of the objective lens, the pickup, the spatial filter, the aperture, and the optical information recording medium to move based on the position error signal.

6. The optical information recording and reproducing apparatus according to claim 4, wherein a plurality of said photo detectors are provided, or the photo detector has a plurality of light-receiving units, and the processor computes the position error signal using a sum or a difference signal among a plurality of signals obtained from the plurality of photo detectors or the plurality of light-receiving units.

7. An optical information recording and reproducing method comprising:

a first step of preparing an optical information recording medium having recorded thereon an interference fringe as a hologram obtained by branching a light beam into reference light and signal light to cause interference;

a second step of reproducing reproduction light by applying the reference light onto the optical information recording medium;

a third step of applying the reproduction light reproduced in the second step via an objective lens onto a spatial filter having an aperture through which the reproduction light from a hologram of a reproduction target formed on the optical information recording medium passes;

a fourth step of detecting the reproduction light applied on a periphery of the aperture with a photo detector; and a fifth step of computing a position error signal indicating a deviation in a relative position between a position of the hologram of the reproduction target formed on the optical information recording medium and a position of the objective lens by using the reproduction light detected in the fourth step, wherein the aperture is disposed to prevent diffracted light coming from a hologram other than the reproduction target formed on the optical information recording medium from being guided to an image pickup element, wherein the spatial filter has a reflective area on the periphery of the aperture on a side where the reproduction light enters, wherein the photo detector is provided at a position different from the image pickup element and the optical information recording medium, and wherein the reflective area is tilted by a predetermined amount with respect to a surface of the spatial filter so as to guide the reproduction light applied on the periphery of the aperture to the photo detector.

8. The optical information recording and reproducing method according to claim 7, further comprising:

a sixth step, after the fifth step, of changing the relative position between the position of the hologram of the reproduction target formed on the optical information recording medium and the position of the objective lens so that the position error signal is zero; and a seventh step of detecting the reproduction light passing through the aperture with an image pickup element and reproducing information recorded on the optical information recording medium.

9. The optical information recording and reproducing method according to claim 8, wherein the sixth step includes confirming that a quantity of the reproduction light passing through the aperture is equal to or more than a predetermined amount.

10. The optical information recording and reproducing method according to claim 7, wherein, in the fourth step, a plurality of said reproduction light applied on the periphery of the aperture are detected correspondingly to a plurality of positions on the periphery of the aperture.

11. The optical information recording and reproducing method according to claim 7, wherein, in the fourth step, the reproduction light applied on the periphery of the aperture is reflected from a reflective area arranged on the periphery of the aperture and is then detected with the photo detector.

12. The optical information recording and reproducing method according to claim 7, wherein, in the fourth step, the reproduction light applied on the periphery of the aperture passes through a polarizing beam splitter and a ¼ wave plate arranged on the periphery of the aperture and is then detected with the photo detector.

13. The optical information recording and reproducing method according to claim 7, wherein, in the fourth step, the photo detector is arranged on the periphery of the aperture.

* * * * *